United States Patent
Kunze

(10) Patent No.: US 11,486,968 B2
(45) Date of Patent: Nov. 1, 2022

(54) VEHICLE LIDAR SENSING SYSTEM WITH SENSOR MODULE

(71) Applicant: Magna Electronics Inc., Auburn Hills, MI (US)

(72) Inventor: Norbert Kunze, Diez (DE)

(73) Assignee: MAGNA ELECTRONICS INC., Auburn Hills, MI (US)

(*) Notice: Subject to any disclaimer, the term of this patent is extended or adjusted under 35 U.S.C. 154(b) by 1000 days.

(21) Appl. No.: 16/190,201

(22) Filed: Nov. 14, 2018

(65) Prior Publication Data

US 2019/0146066 A1    May 16, 2019

Related U.S. Application Data

(60) Provisional application No. 62/586,335, filed on Nov. 15, 2017.

(51) Int. Cl.
*G01S 7/481* (2006.01)
*G01S 17/931* (2020.01)

(52) U.S. Cl.
CPC .......... *G01S 7/4813* (2013.01); *G01S 17/931* (2020.01); *G01S 7/4817* (2013.01)

(58) Field of Classification Search
CPC ........ B60W 2420/52; F05B 2270/8042; G01C 21/1652; G01N 2201/0813; G01S 7/4813;
(Continued)

(56) References Cited

U.S. PATENT DOCUMENTS 5,815,251 A * 9/1998 Ehbets .................. G01S 7/4818
356/5.01
5,949,331 A    9/1999 Schofield et al.
(Continued)

FOREIGN PATENT DOCUMENTS

CN    102205823 A * 10/2011 ............. G01S 7/521
DE    10244641 A1 * 4/2004 ........... G01S 7/4815
(Continued)

OTHER PUBLICATIONS

"Wikipedia, Lidar, Apr. 13, 2017" (Year: 2017).*
(Continued)

*Primary Examiner* — Luke D Ratcliffe
*Assistant Examiner* — Woohyeong Cho
(74) *Attorney, Agent, or Firm* — Honigman LLP

(57) ABSTRACT

A lidar sensing system for a vehicle includes a sensor module having a laser unit, a sensor unit, and a cover unit. The laser unit includes a housing with reference surfaces machined thereat for positioning laser tubes. The laser unit includes a tension spring that urges the laser tubes against the reference surfaces of the housing. The sensor unit includes a holder with reference surfaces machined thereat for positioning receiver tubes. The sensor unit includes a tension spring that urges the receiver tubes against the reference surfaces of the holder. The holder is attached at the housing and the cover unit is attached at the housing. An output of the sensor module is communicated to a control that, responsive to the output of the sensor module, determines the presence of one or more objects exterior the vehicle and within the field of sensing of the sensor module.

18 Claims, 25 Drawing Sheets

(58) Field of Classification Search
CPC .................. G01S 7/4817; G01S 17/88; G05B 2219/40563; G05D 1/021; G05D 1/0289; G02B 2006/12114; G02B 5/045; G02B 6/3528

See application file for complete search history.

(56) References Cited

U.S. PATENT DOCUMENTS

| | | |
|---|---|---|
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,693,517 B2 | 2/2004 | McCarthy et al. |
| 6,710,770 B2 | 3/2004 | Tomasi et al. |
| 6,825,455 B1 | 11/2004 | Schwarte |
| 6,876,775 B2 | 4/2005 | Torunoglu |
| 6,906,793 B2 | 6/2005 | Bamji et al. |
| 6,919,549 B2 | 7/2005 | Bamji et al. |
| 7,053,357 B2 | 5/2006 | Schwarte |
| 7,157,685 B2 | 1/2007 | Bamji et al. |
| 7,176,438 B2 | 2/2007 | Bamji et al. |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,580,795 B2 | 8/2009 | McCarthy et al. |
| 8,013,780 B2 | 9/2011 | Lynam |
| 8,027,029 B2 | 9/2011 | Lu et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,252,703 B2 | 4/2019 | Ina |
| 10,703,341 B2 | 7/2020 | Kunze |
| 2003/0222156 A1 | 12/2003 | Bissonnette |
| 2007/0181784 A1* | 8/2007 | Twiney .................. G01V 8/10 250/221 |
| 2007/0236364 A1 | 10/2007 | Hubbard et al. |
| 2009/0122141 A1 | 5/2009 | Nakamura et al. |
| 2010/0001897 A1 | 1/2010 | Lyman |
| 2010/0245066 A1 | 9/2010 | Sarioglu et al. |
| 2012/0062743 A1 | 3/2012 | Lynam et al. |
| 2012/0117745 A1 | 5/2012 | Hattori et al. |
| 2012/0158353 A1* | 6/2012 | Sosnovskiy ............ G01S 17/06 702/150 |
| 2012/0218412 A1 | 8/2012 | Dellantoni et al. |
| 2013/0215271 A1 | 8/2013 | Lu |
| 2013/0222592 A1 | 8/2013 | Gieseke |
| 2014/0158731 A1 | 6/2014 | Squire |
| 2014/0218529 A1 | 8/2014 | Mahmoud et al. |
| 2014/0375476 A1 | 12/2014 | Johnson et al. |
| 2015/0078940 A1 | 3/2015 | Kikuta |
| 2015/0124096 A1 | 5/2015 | Koravadi |
| 2015/0158499 A1 | 6/2015 | Koravadi |
| 2015/0251599 A1 | 9/2015 | Koravadi |
| 2015/0352953 A1 | 12/2015 | Koravadi |
| 2016/0036917 A1 | 2/2016 | Koravadi et al. |
| 2016/0210853 A1 | 7/2016 | Koravadi |
| 2016/0272163 A1 | 9/2016 | Dreiocker et al. |
| 2017/0129489 A1 | 5/2017 | Pawlicki et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0052236 A1* | 2/2018 | Hoffman, Jr ............ B60R 11/00 |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0105176 A1 | 4/2018 | Pawlicki et al. |
| 2018/0172878 A1 | 6/2018 | Hsiao |
| 2018/0222450 A1 | 8/2018 | Kunze |
| 2018/0231635 A1 | 8/2018 | Woehlte |
| 2018/0231657 A1 | 8/2018 | Woehlte |
| 2018/0299533 A1 | 10/2018 | Pliefke et al. |
| 2019/0061760 A1 | 2/2019 | Pawlicki et al. |
| 2019/0072666 A1 | 3/2019 | Duque Biarge et al. |
| 2019/0072667 A1 | 3/2019 | Duque Biarge et al. |
| 2019/0072668 A1 | 3/2019 | Duque Biarge et al. |
| 2019/0072669 A1 | 3/2019 | Duque Biarge et al. |
| 2019/0100171 A1 | 4/2019 | Ina |
| 2019/0217775 A1 | 7/2019 | May et al. |
| 2019/0337466 A1 | 11/2019 | Oba |
| 2019/0339382 A1 | 11/2019 | Hess et al. |

FOREIGN PATENT DOCUMENTS

| | | | |
|---|---|---|---|
| DE | 102017116595 A1 * | 1/2019 | ............ G01S 17/42 |
| WO | WO-2010004931 A * | 1/2010 | ............ G01S 7/481 |
| WO | 2011090484 A1 | 7/2011 | |
| WO | 2018007995 A1 | 1/2018 | |

OTHER PUBLICATIONS

"Fei, Zixuan, Zhou, Xiang, Gao, Xiaofei, Zhang, and Guanliang, A flexible 3D laser scanning system using a robotic arm, Jun. 26, 2017, Optical Measurement Systems for Industrial Inspection X" (Year: 2017).*

* cited by examiner

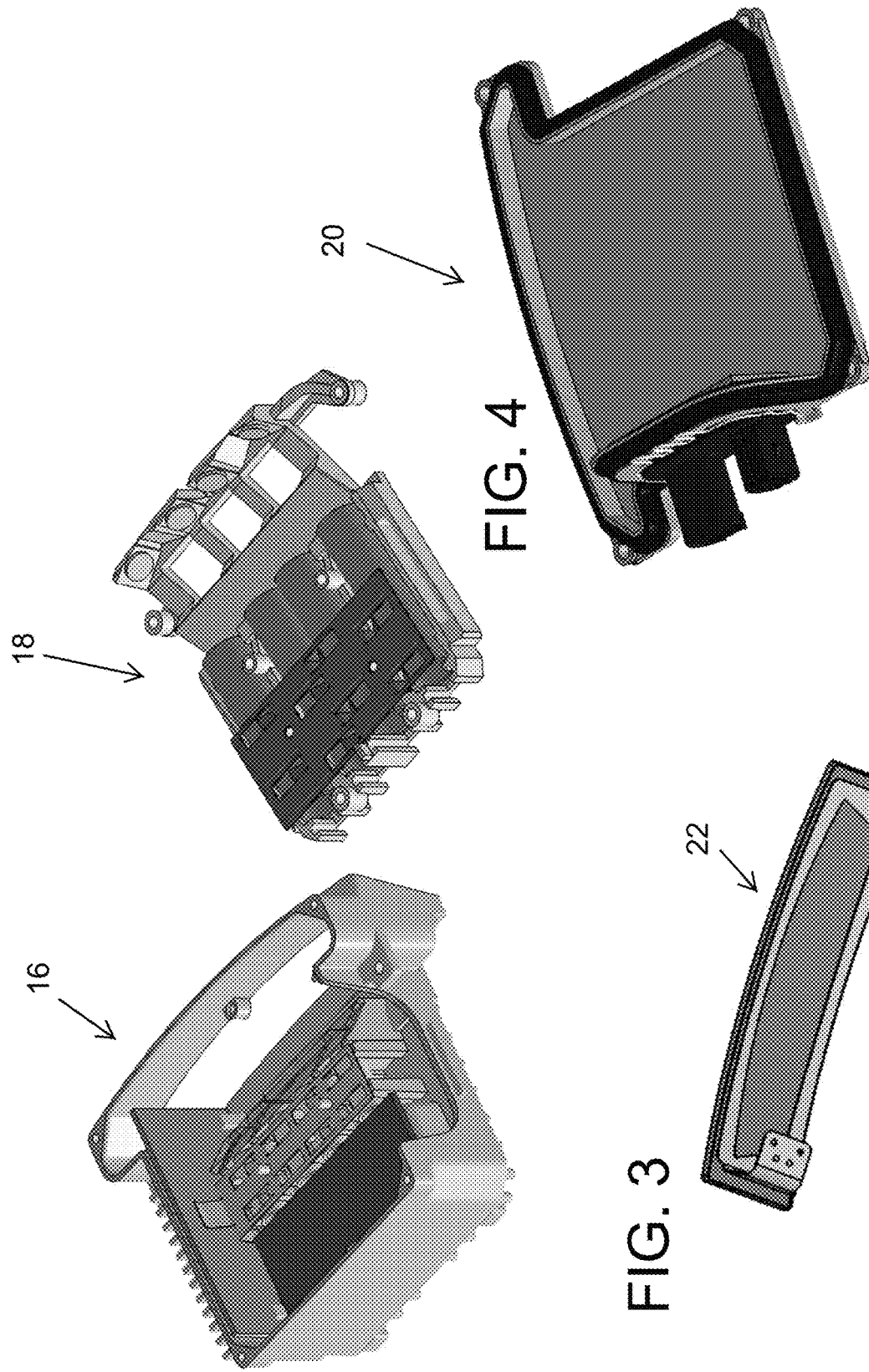

VEHICLE LIDAR SENSING SYSTEM WITH SENSOR MODULE

CROSS REFERENCE TO RELATED APPLICATION

The present application claims the filing benefits of U.S. provisional application Ser. No. 62/586,335, filed Nov. 15, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module disposed at the vehicle to sense a respective region exterior of the vehicle, with the sensor module comprising at least one Lidar sensor disposed in a housing. The sensor module includes a housing that houses a laser unit and a sensor unit. A cover portion includes an electrical connector and attaches to the housing to house the laser unit and sensor unit.

The sensor module provides a two-part design with accurately machined referencing surfaces for each part (for the laser unit and for the receiver unit). The sensor module also provides an enhanced way of fixing the eight tubes (e.g., four laser tubes and four receiver tubes) with tension springs, which push the respective tubes against the respective reference surfaces. The sensor module uses a tension spring to additionally press a printed circuit board or PCB (Power PCB) against a side wall of the housing for thermocouple coupling. By holding and adjusting the sensors in individual nests of the mirror holder with slotted foils, the sensor module allows for adjustment in six degrees of freedom while reducing the mechanical stresses in the foil.

These and other objects, advantages, purposes and features of the present invention will become apparent upon review of the following specification in conjunction with the drawings.

BRIEF DESCRIPTION OF THE DRAWINGS

FIG. 3 is a perspective view of the laser unit of the sensor module;

FIG. 4 is a perspective view of the sensor unit of the sensor module;

FIG. 5 is a perspective view of the cover of the sensor module;

FIG. 6 is a perspective view of the window of the sensor module;

DESCRIPTION OF THE PREFERRED EMBODIMENTS

Figure 1:
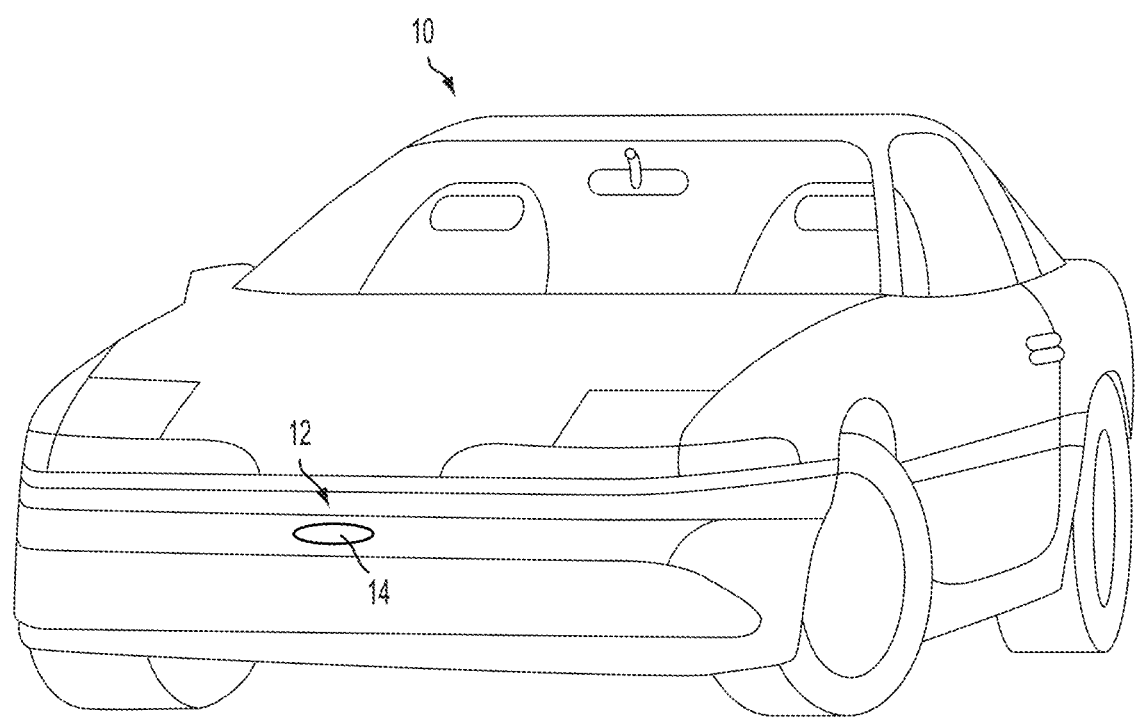
FIG. 1 is a perspective view of a vehicle with a sensing system that incorporates a sensor module in accordance with the present invention.

A vehicle sensing system, such as a driver assist system, object detection system, parking assist system and/or alert system, operates to capture sensing data exterior of the vehicle and may process the captured data to detect objects at or near the vehicle and in the predicted path of the vehicle, such as to assist a driver of the vehicle in maneuvering the vehicle in a forward or rearward direction or to assist the driver in parking the vehicle in a parking space (or to assist an autonomous vehicle control in controlling the vehicle autonomously or semi-autonomously). The system includes a processor that is operable to receive sensing data from multiple sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle), or controls one or more vehicle systems.

Referring now to the drawings and the illustrative embodiments depicted therein, a vehicle 10 includes an driver assistance system or sensing system 12 that includes at least one Lidar sensor unit, such as a forward facing Lidar sensor module or unit 14 (and the system may optionally include multiple exterior facing sensors, such as other Lidar sensors and/or other non-imaging sensors and/or cameras or imaging sensors, such as a rearward facing sensor at the rear of the vehicle, and a sideward/rearward facing sensor at respective sides of the vehicle), which sense regions exterior of the vehicle. The lidar module or system illuminates a target area with pulsed laser light and measures how long it takes for reflected signals to be returned to the receiver of the module. The lidar module or system includes a laser source or transmitter or laser tube or tubes or laser collimator, a sensitive photodetector or receiver or receiving tube or tubes, synchronization and data processing electronics. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle. The Lidar sensor module and system may utilize aspects of the sensing modules and systems described in U.S. Publication No. US-2018-0222450, which is hereby incorporated herein by reference in its entirety.

The automotive Lidar sensor module of the present invention is configured to be mounted at an exterior portion of the vehicle for detecting the exterior environmental scene at or surrounding or partially surrounding the vehicle. Optionally, multiple Lidar sensor modules, possibly with identical housings, may come into use. A preferred location for these Lidar sensor modules to mount is within the bumper of the vehicle and viewing or sensing outwardly (such as forward, rearward and/or sideward of the vehicle). Generally, every design element at or in which a Lidar sensor can be hidden and has an effectual view opening is optionally a place for mounting a Lidar sensor, such as at the front grill, the head lights, the daytime running lights, a blinker, the license plate illumination, the tire housings, the vehicle emblem, the trunk lid opener handle, the door handles, the rearview mirrors or wing elements with rear view cameras at the place where usually the rearview mirrors were, the rooftop bars, the roof top antenna fins or the spoiler or the like.

Figure 2:
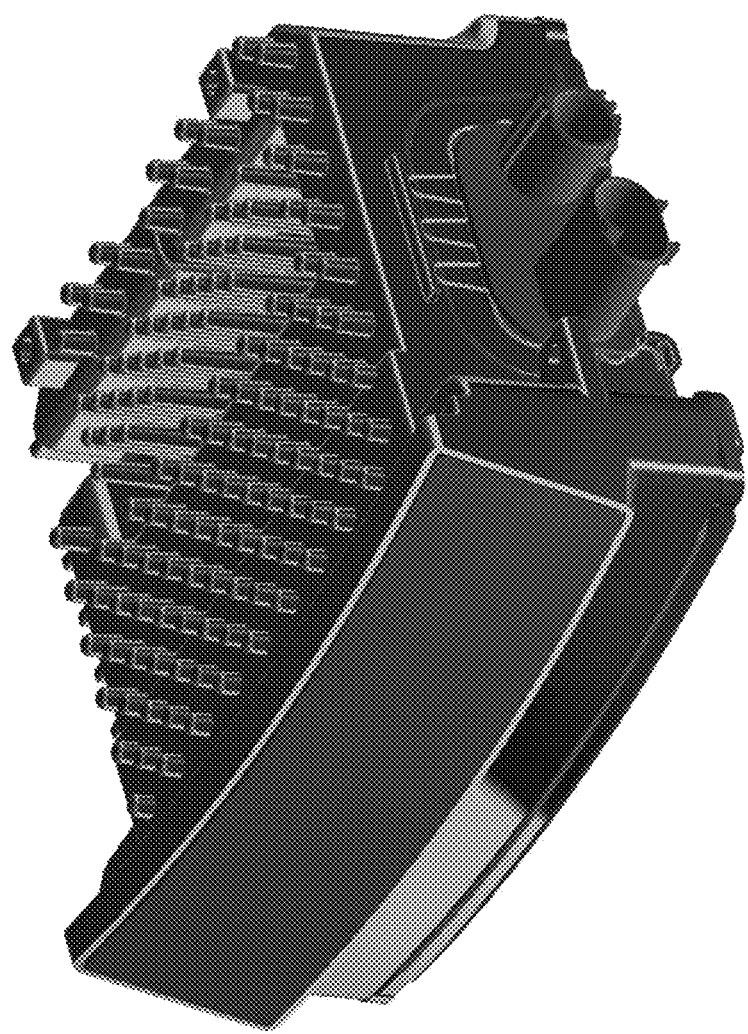
FIG. 2 is a perspective view of the sensor module of the present invention.
Figure 7:
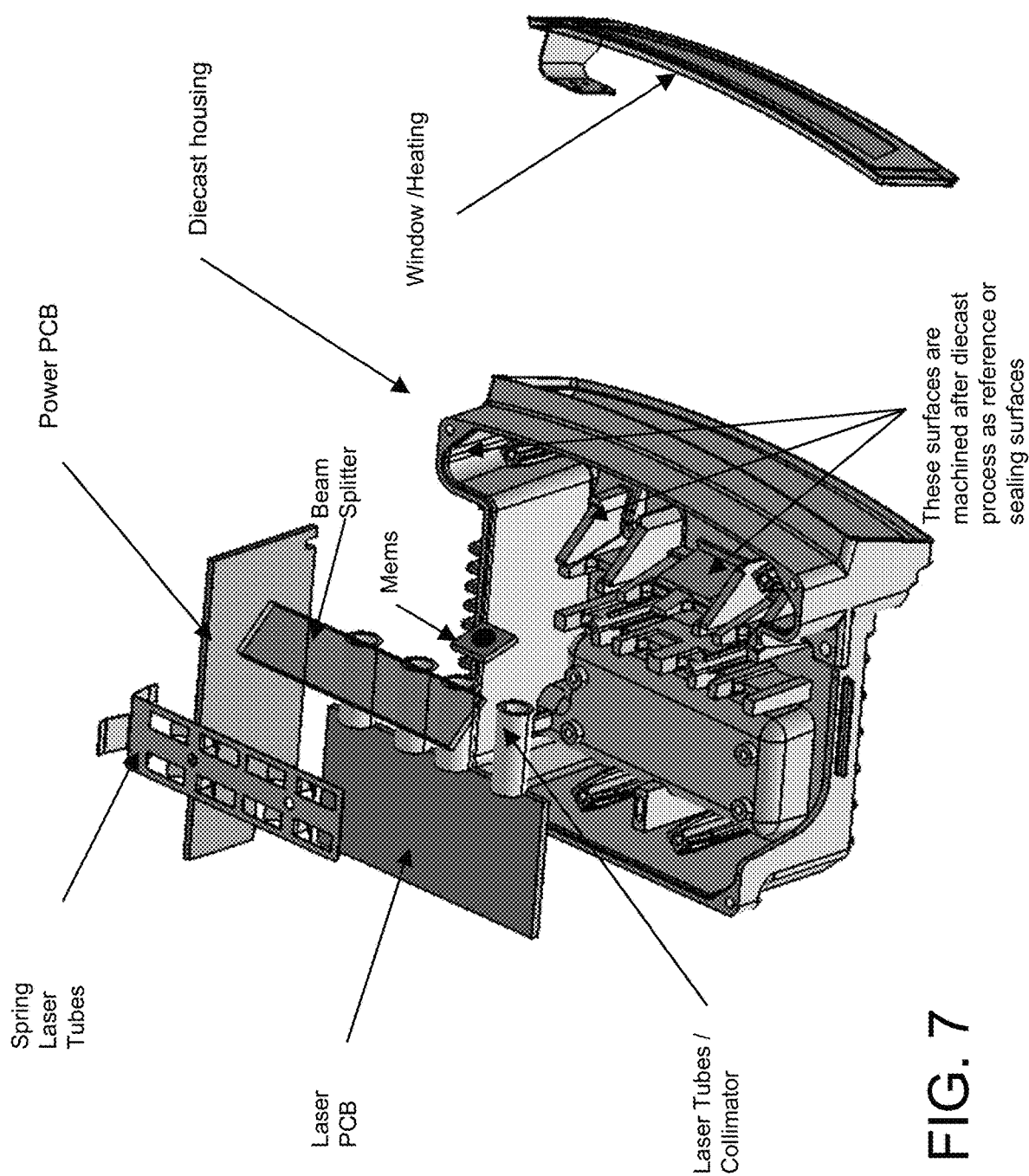
FIG. 7 is an exploded perspective view of the laser unit of the sensor module.
Figure 8:
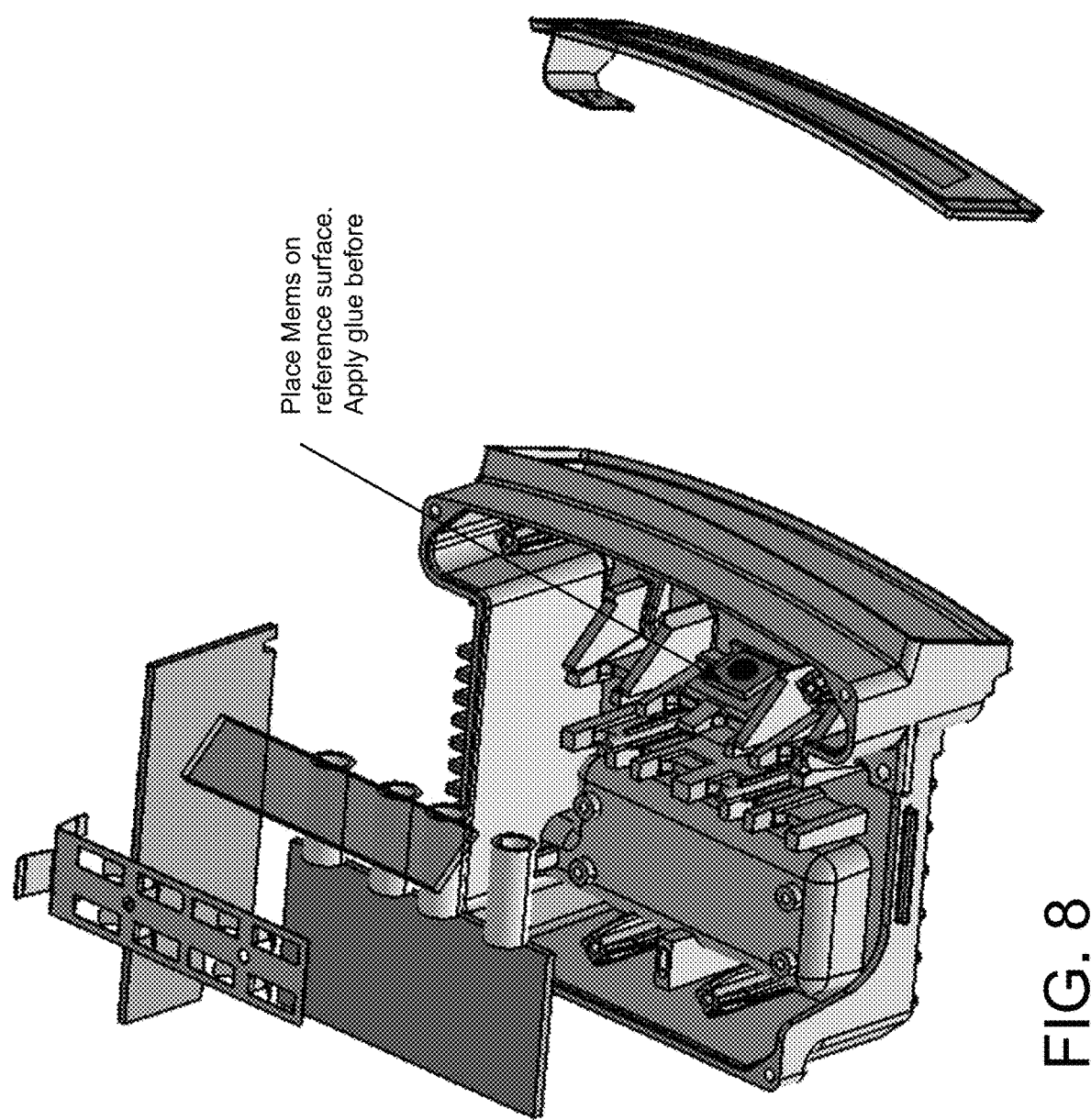
FIGS. 8-14 are perspective views showing the assembly process of the laser unit of the sensor module.
Figure 9:
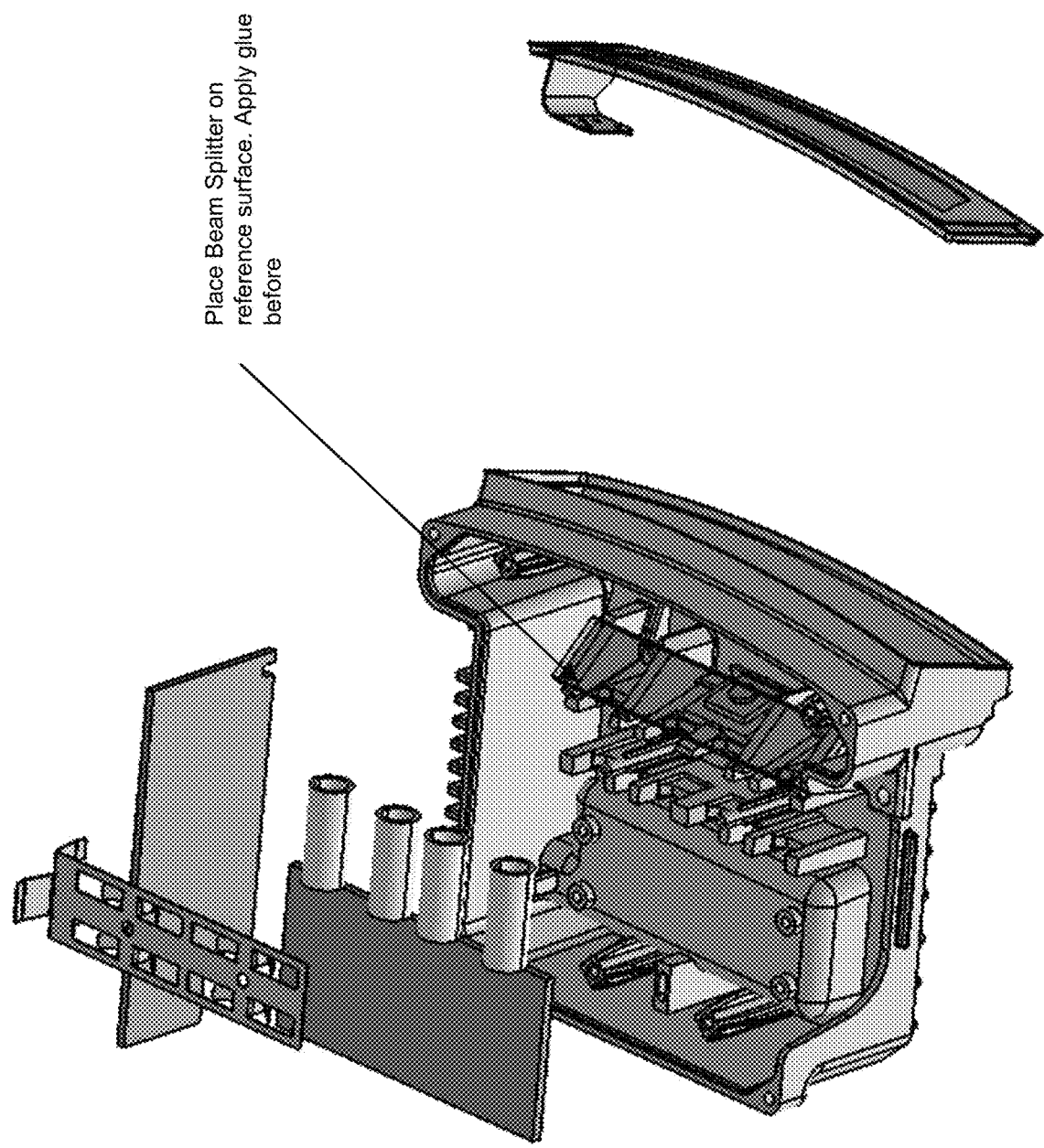
Figure 10:
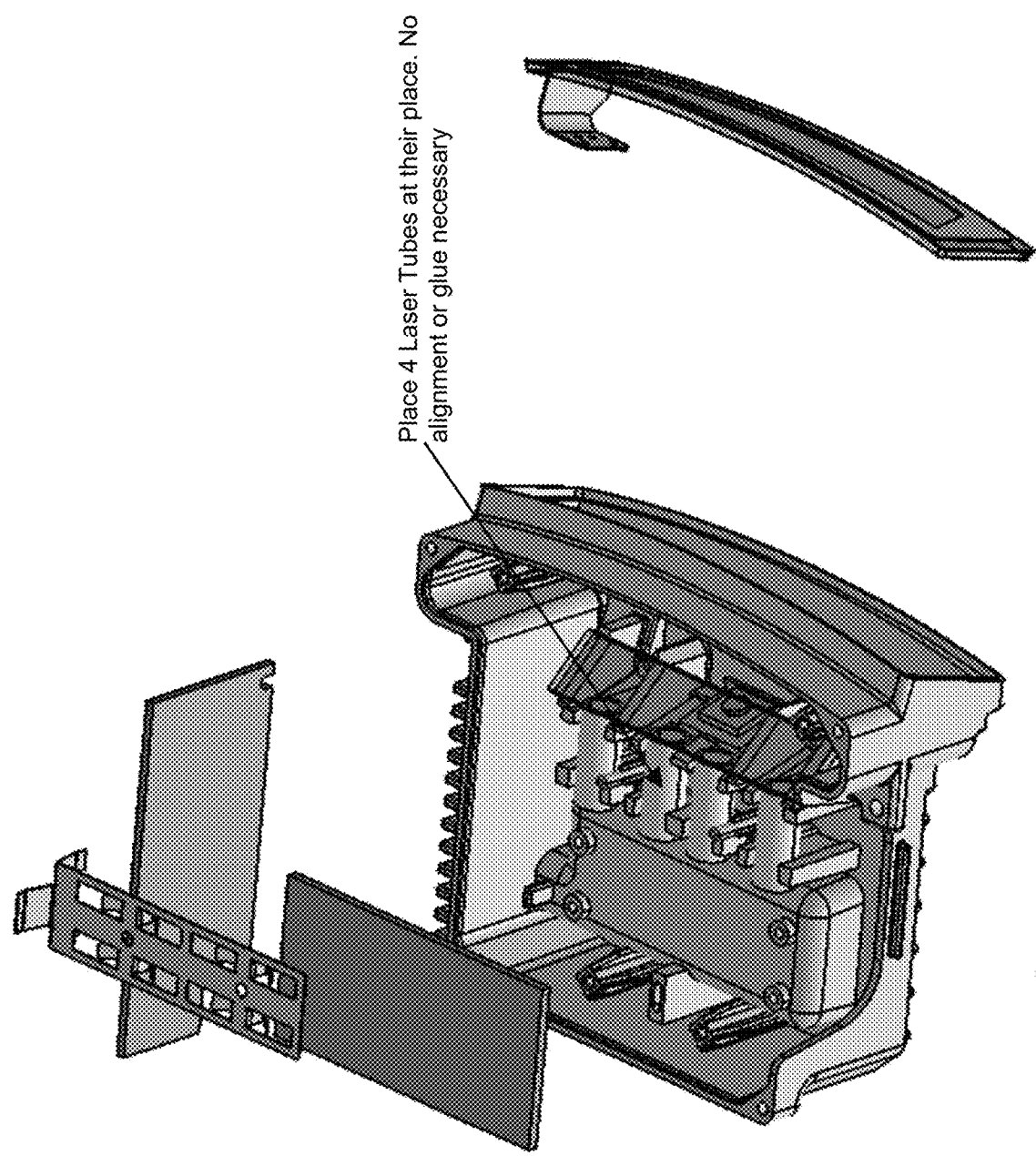
Figure 14A:
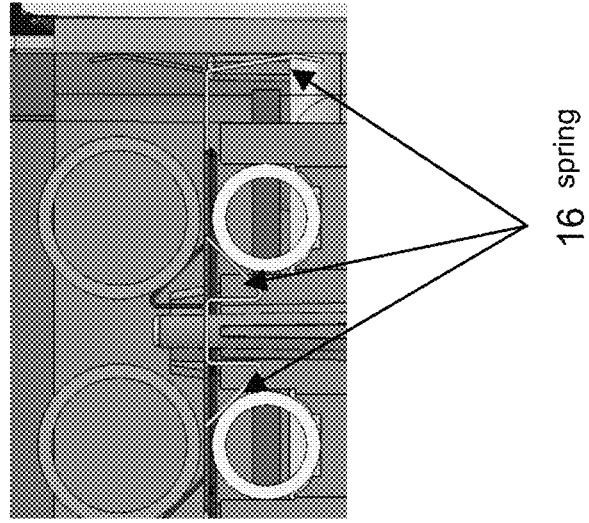
FIG. 14A is an end view of the laser unit and sensor unit, showing the biasing of the laser tubes via a spring element.
Figure 14:
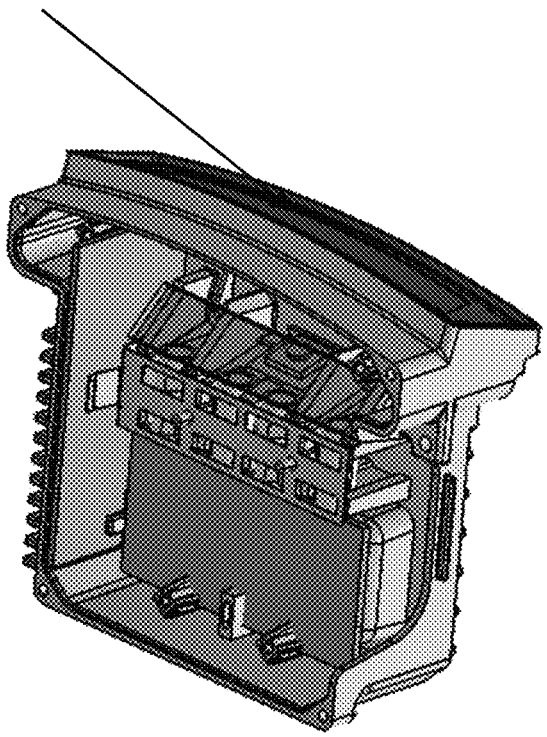
Figure 16:
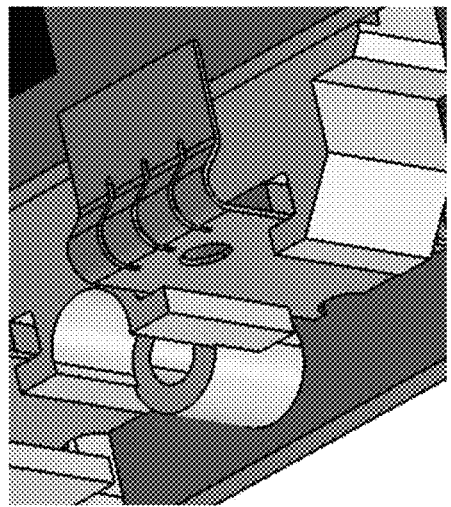
FIG. 16 is an enlarged perspective view of the sensors at the diecast mirror holder of the sensor unit.
Figure 15:
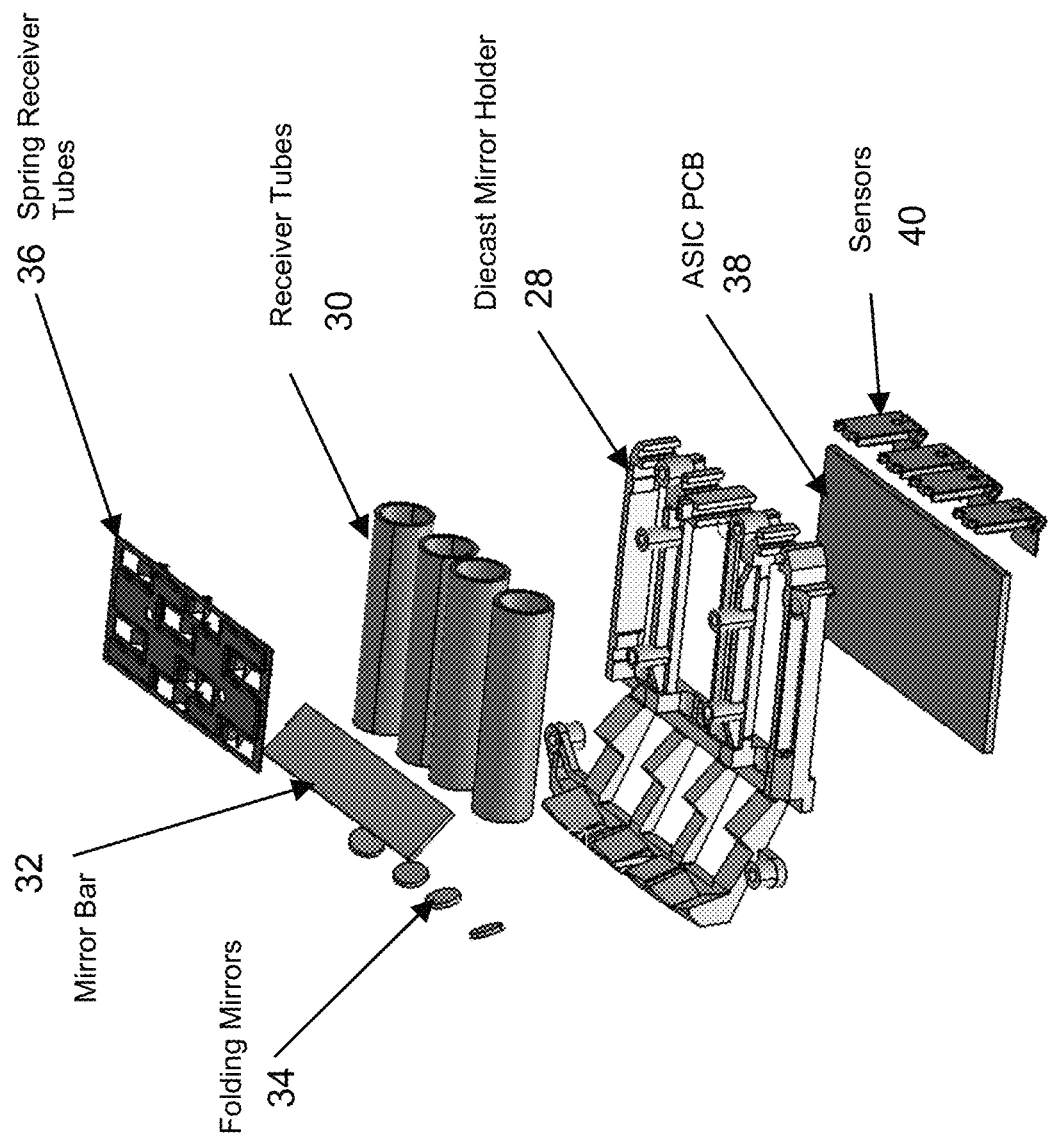
FIG. 15 is an exploded perspective view of the sensor unit of the sensor module.

The sensor module 14 (FIG. 2) comprises a laser unit 16 (FIG. 3), a sensor unit 18 (FIG. 4), a cover unit 20 (FIG. 5) and a window/heating element 22 (FIG. 6). As shown in FIG. 7, the laser unit includes a diecast metallic housing, a microelectromechanical system (MEMS), a beam splitter, a plurality of laser tubes or collimators (that have the laser emitters of the laser PCB at one end and that collimate the light emitted by the emitters so that collimated laser light is emitted from the opposite end of the laser tubes), a laser PCB (having the plurality of laser light emitters disposed thereat), a power PCB, and a laser tube spring. As shown in FIGS. 8-13, these elements are disposed at the housing and affixed thereat to form the laser unit. The window/heating element is attached at an opening of the housing (FIG. 14).

In the illustrated embodiment, the diecast housing includes a plurality of machined surfaces to provide reference or sealing surfaces (where various components of the laser unit may be disposed or attached and where the sensor unit may be attached and where the cover unit may be attached, as discussed below). The MEMS is disposed at one of the reference surfaces (FIG. 8) and adhesively attached thereat. The beam splitter is placed on reference surfaces (FIG. 9) and adhesively attached thereat. The beam splitter and MEMS have to be placed on their reference surfaces in the diecast housing. No alignment is needed, they may be simply adhesively bonded or glued in place and are at the proper orientation due to the machined reference surfaces. They are to be fixed during the gluing process in a jig, and may be accessed from the open top of the housing and through the window opening.

The laser tubes are placed in receiving portions of the housing (FIG. 10), with no alignment or adhesive being necessary. Each laser tube is thus in contact with two machined surfaces in the diecast housing with little gap to the opposite side. The tubes will be pressed against the sidewall by the spring force of the laser tube spring 22 that is attached at the housing (FIGS. 12 and 13), and thus they are well-referenced.

Figure 11:
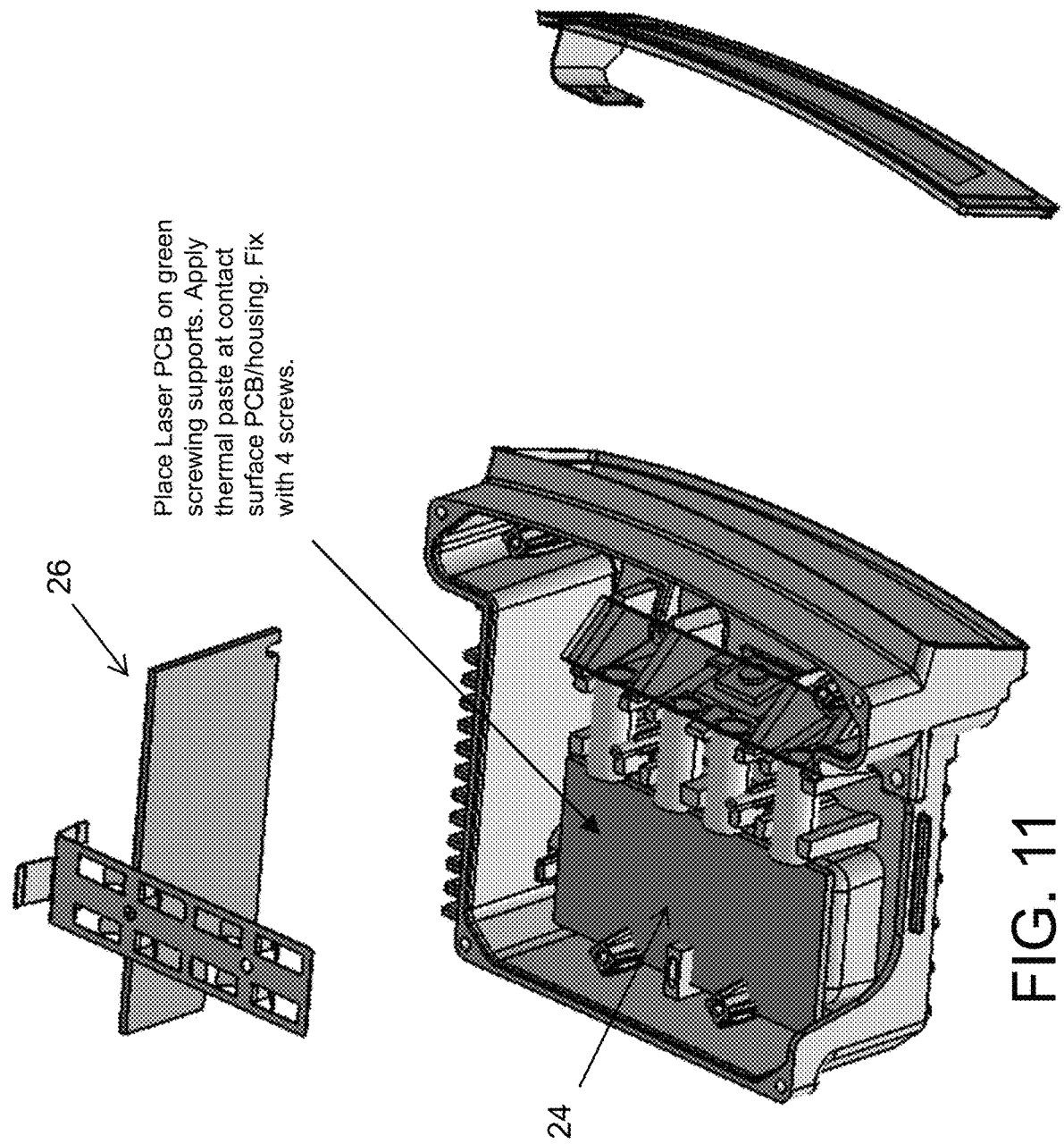
Figure 12:
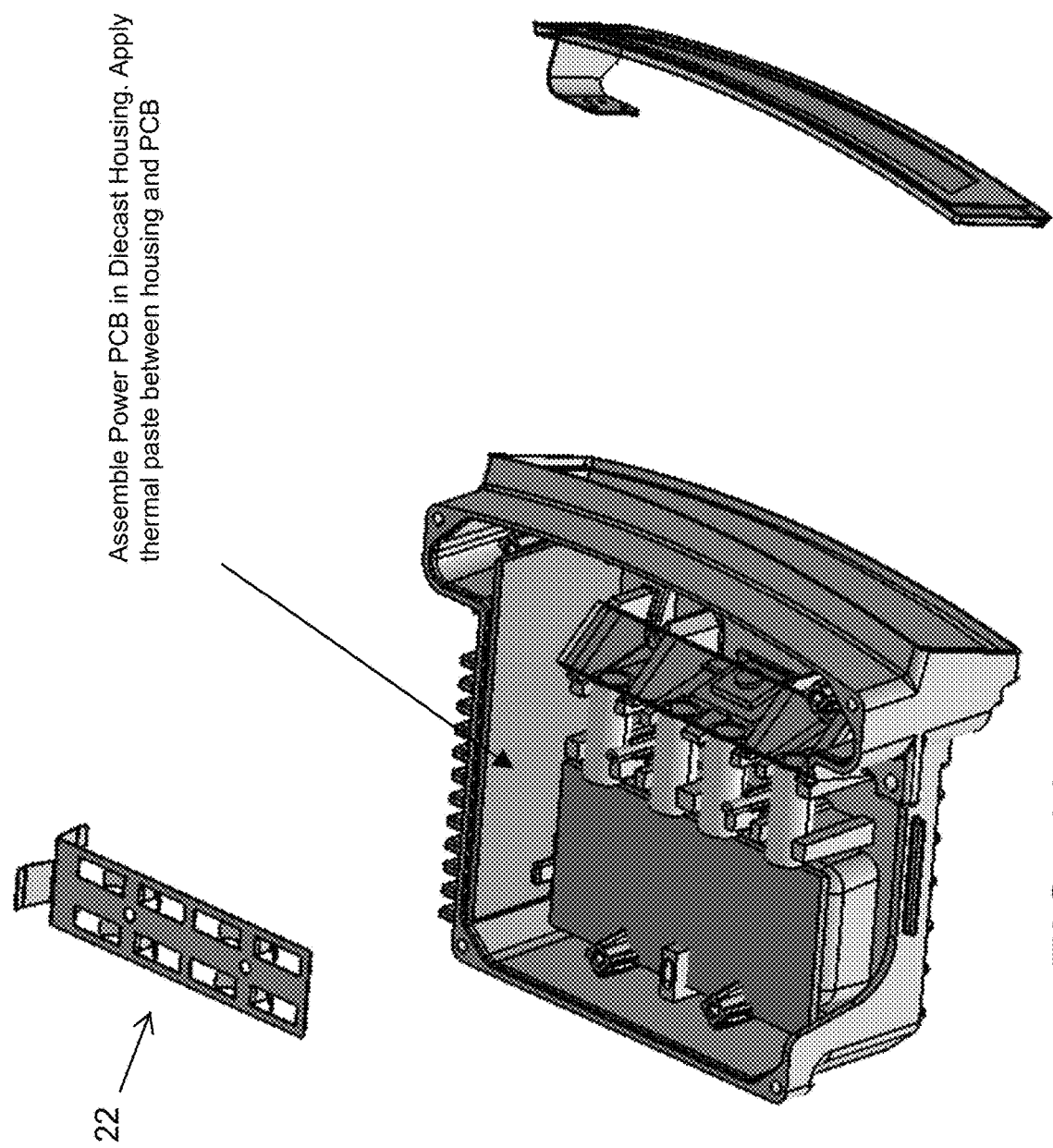
Figure 13:
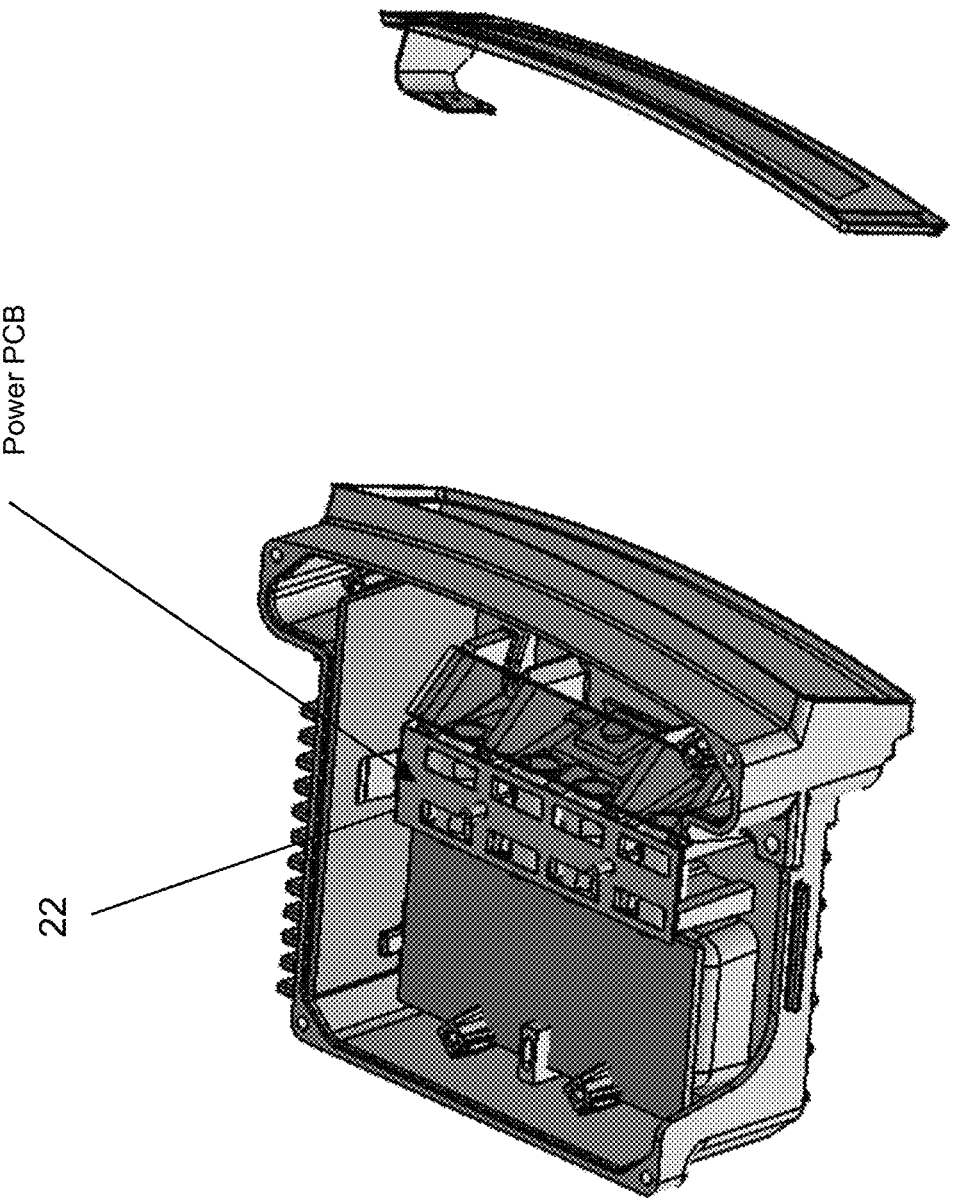

The laser PCB 24 is placed at supports of the housing (FIG. 11). A thermal paste may be applied at the contact surface of the PCB and/or housing, and the PCB may be affixed via fasteners, such as four screws. The power PCB is assembled in the diecast housing along a sidewall of the housing (FIG. 12). A thermal paste may be applied between the housing sidewall and the power PCB. The housing sidewall may include a plurality of fins or heat sink elements to enhance heat dissipation at the sidewall. The spring is disposed at the housing over the laser tubes (FIG. 13) and fixes the four laser tubes and the power PCB relative to the housing (FIG. 14A). The window (with heating, such as via a transparent electronic conductor disposed at and over the window or such as via embedded resistive wires at the window or the like) is placed at the housing and may be fixed thereat and sealed via an adhesive or sealant (FIG. 14). The electrical connections for the laser unit (such as between the PCBs and the electrical elements) may be done when the laser unit assembly is completed.

Referring now to FIGS. 15-22, the sensor unit comprises a diecast metallic mirror holder 28, receiver tubes 30 (that receive laser light that has been emitted by the laser tubes and reflected off objects in the field of sensing of the sensing module and that direct the received light toward the sensors), a mirror bar 32, folding mirrors 34, spring receiver tubes 36, an ASIC PCB 38 and sensors 40. The subcomponent with alignment of sensor diodes may be necessary (see FIG. 16). The sensors are connected via flex-foil with gaps to obtain better flexibility. Alignment with 4-fold 3-finger gripper achieves six degrees of freedom adjustability of the sensors (e.g., translational adjustment along x, y and z axes and rotational adjustment about pitch, yaw and roll axes).

Figure 17:
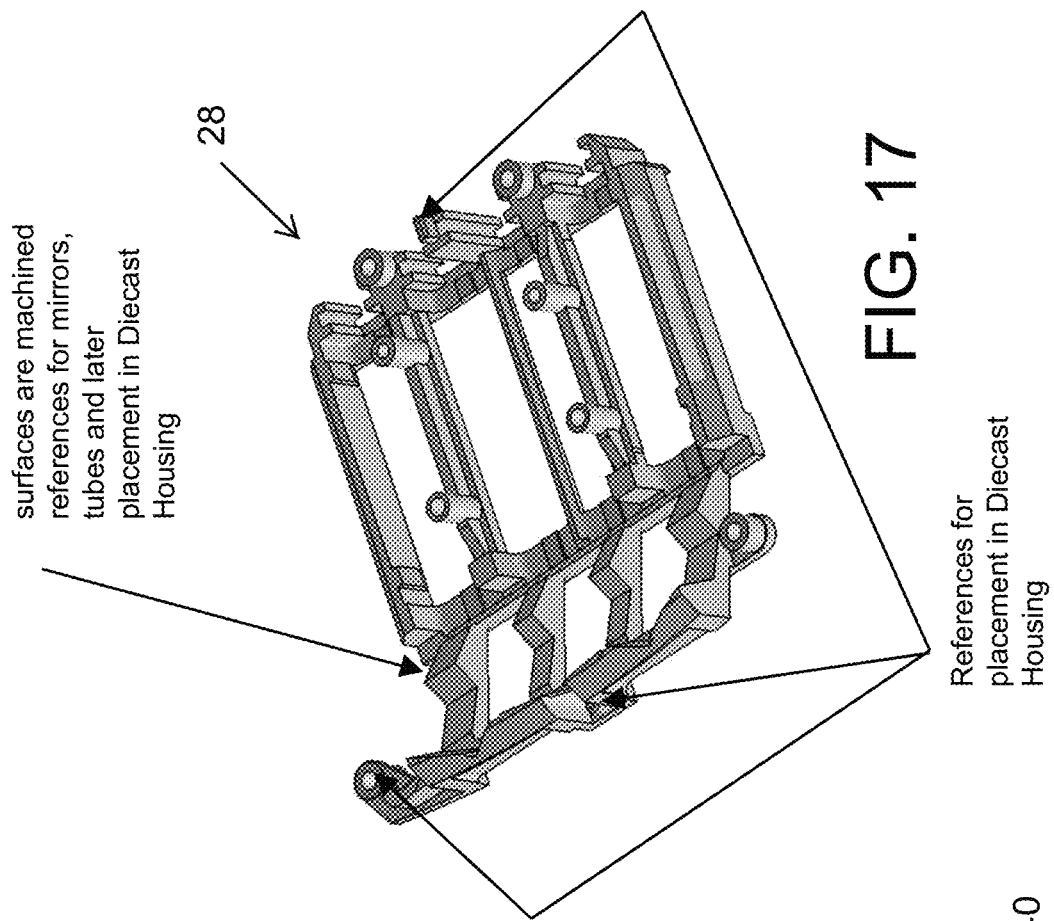
FIG. 17 is a perspective view of the diecast mirror holder.
Figure 18:
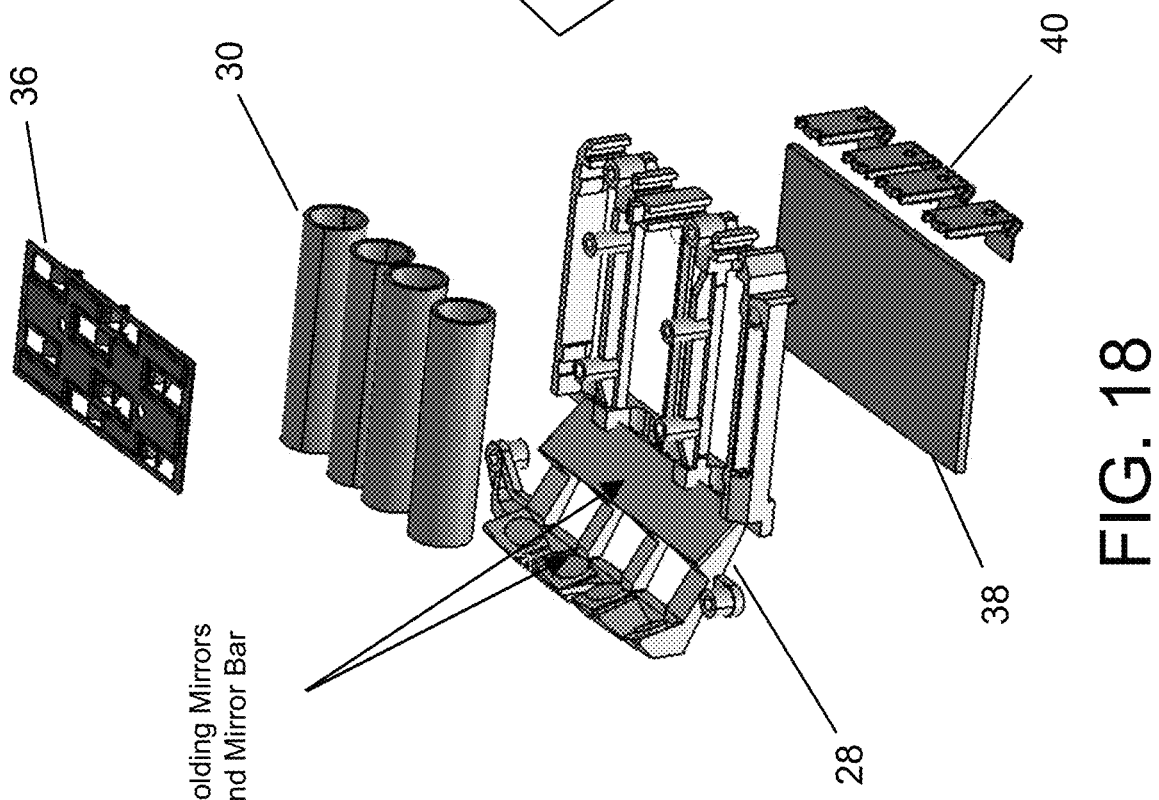
FIGS. 18-22 are perspective views showing the assembly process of the sensor unit of the sensor module.

As shown in FIG. 17, the diecast mirror holder 28 has machined surfaces to provide machined references for the mirrors, tubes and later placement in the diecast housing of the laser unit. The folding mirrors and mirror bar are disposed at respective reference surfaces of the mirror holder (FIG. 18), and may be adhesively attached thereat. The mirror holder is accurately produced with surfaces for contact to the mirror surface and surfaces for contact to reference features in the diecast housing.

Figure 19:
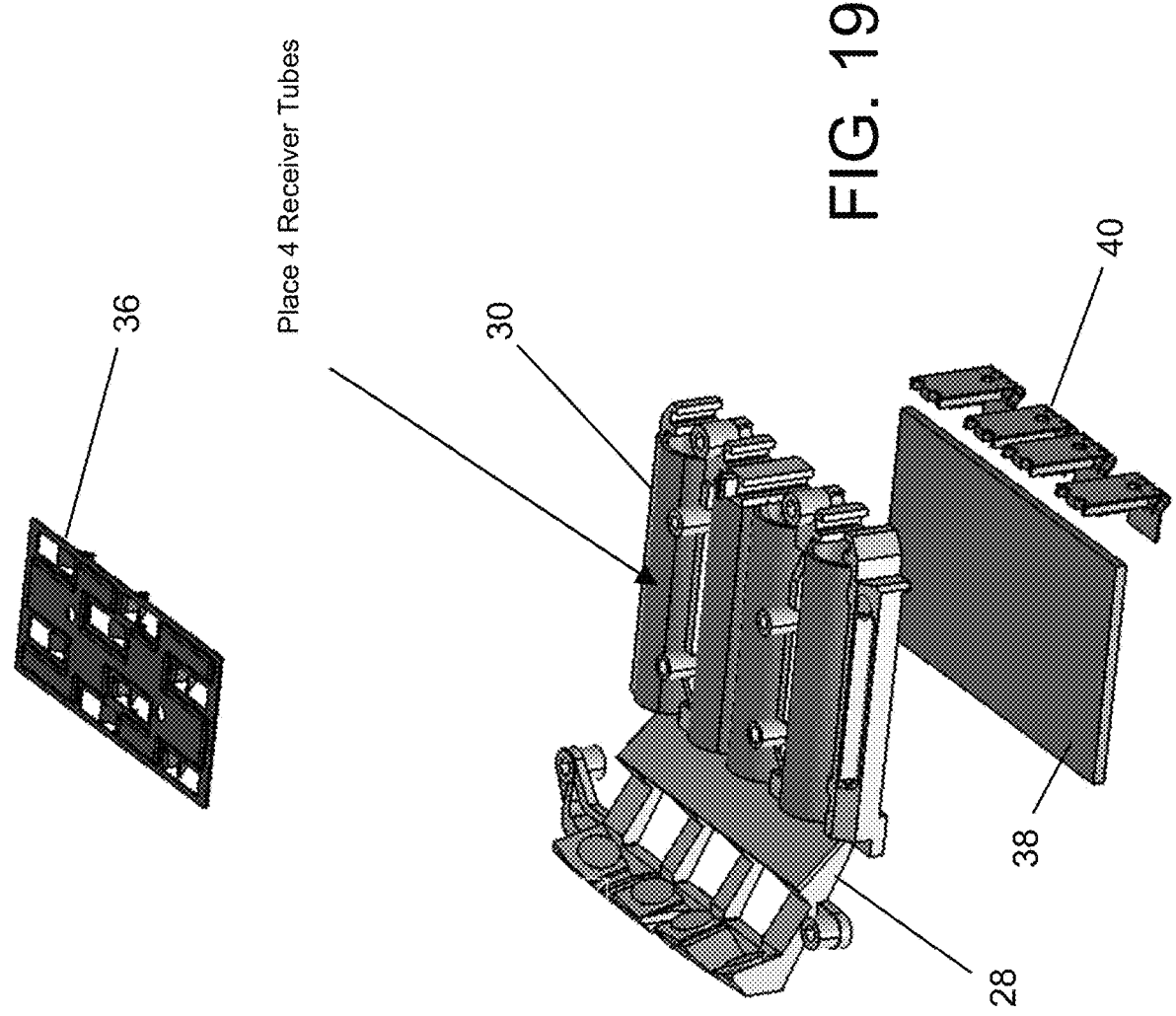
Figure 20:
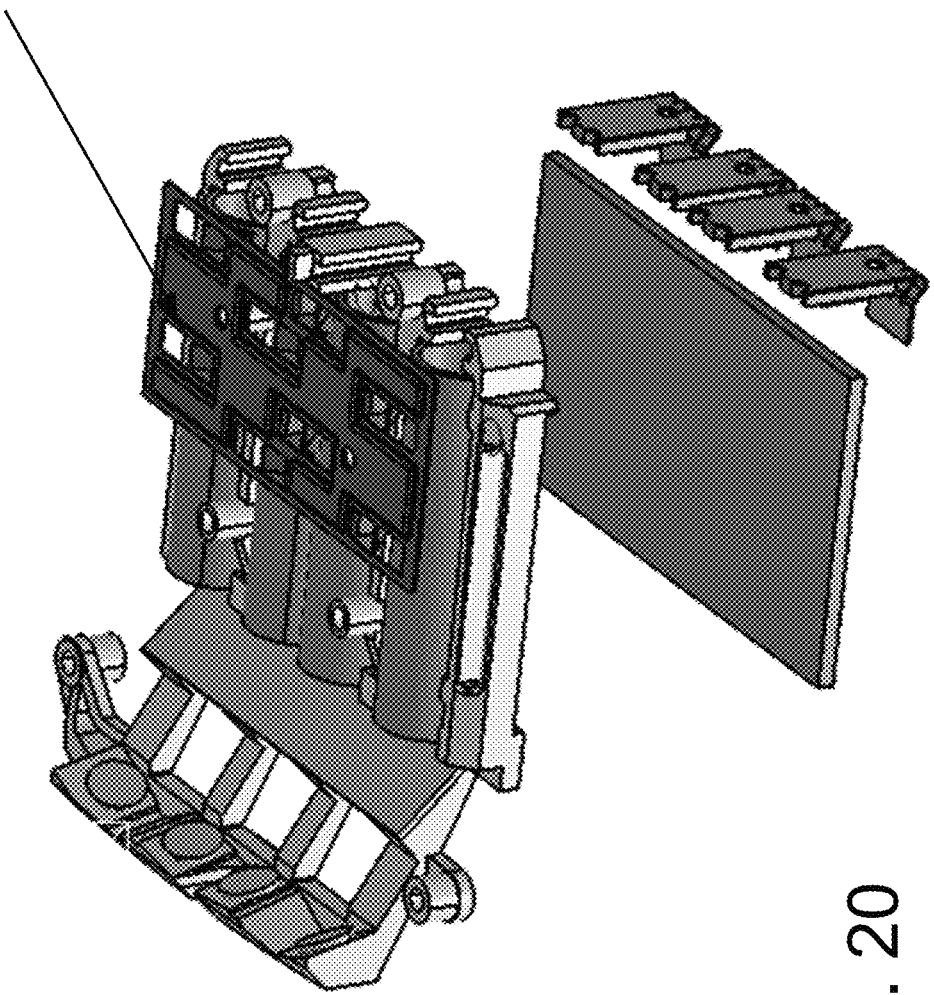
Figure 21:
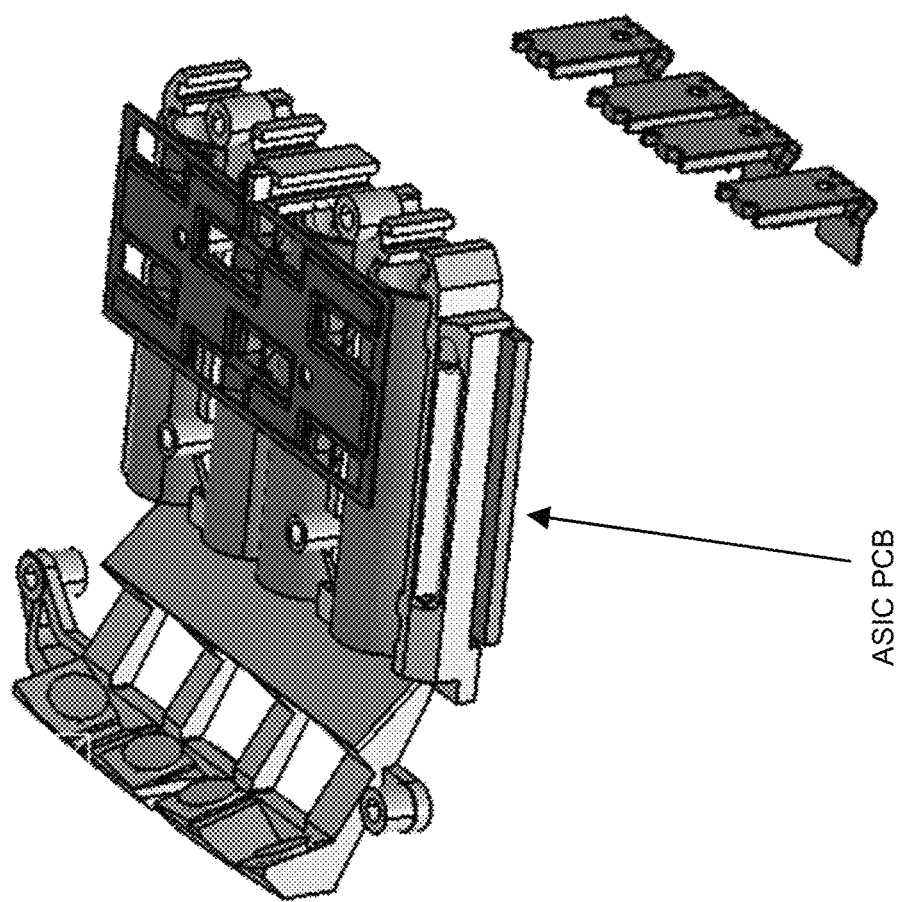
Figure 22A:
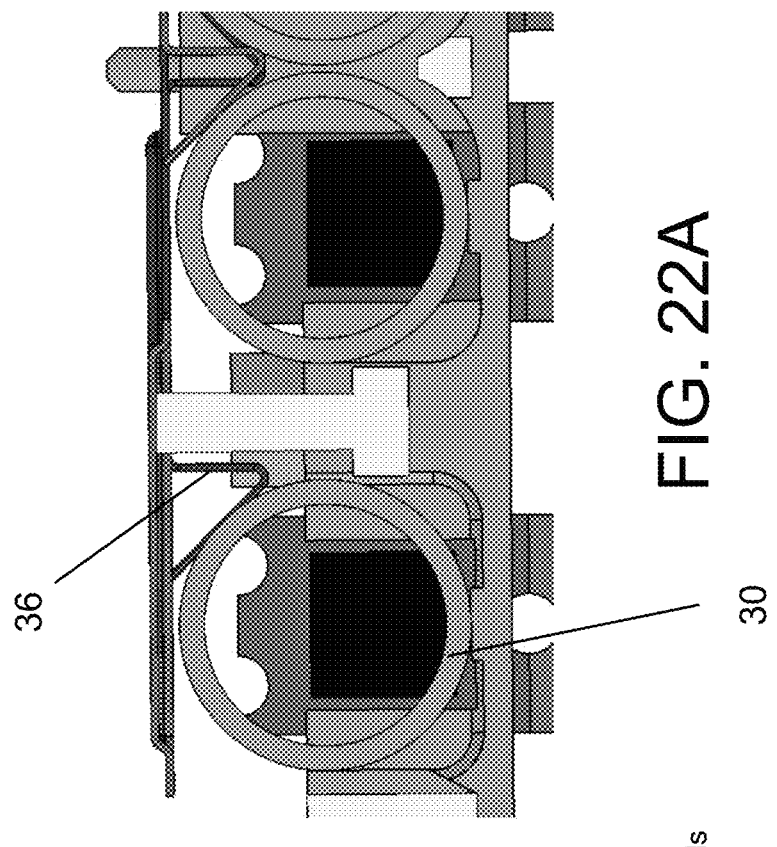
FIG. 22A is an end view showing the receiver tubes urged against two surfaces via a spring element.
Figure 22:
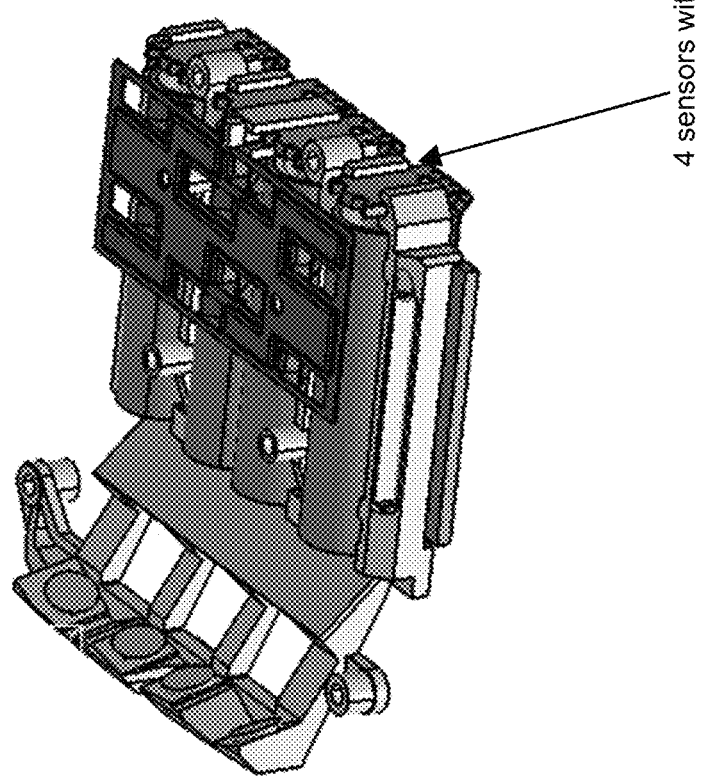
Figure 23:
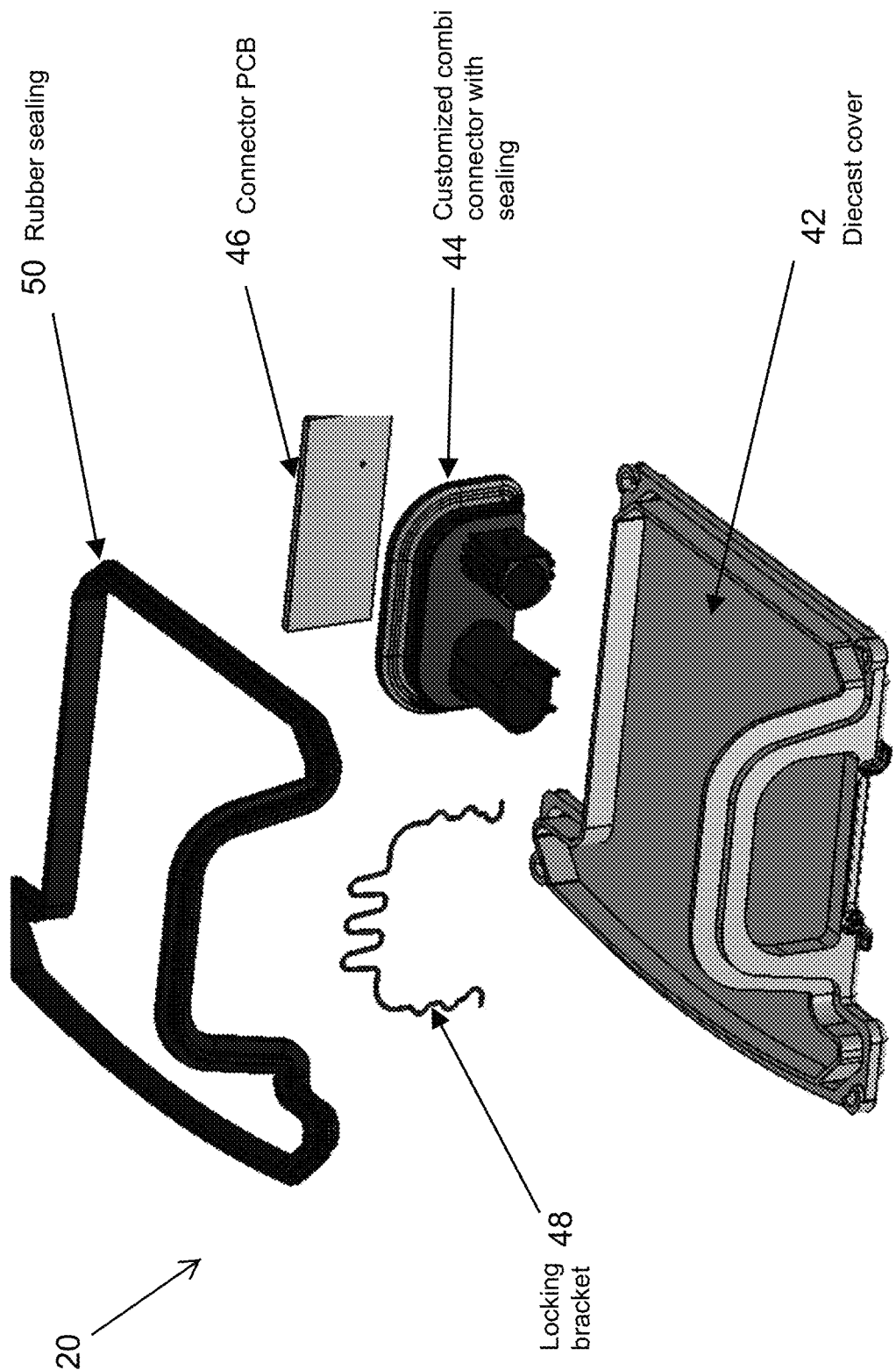
FIG. 23 is an exploded perspective view of the cover of the sensor module.
Figure 24:
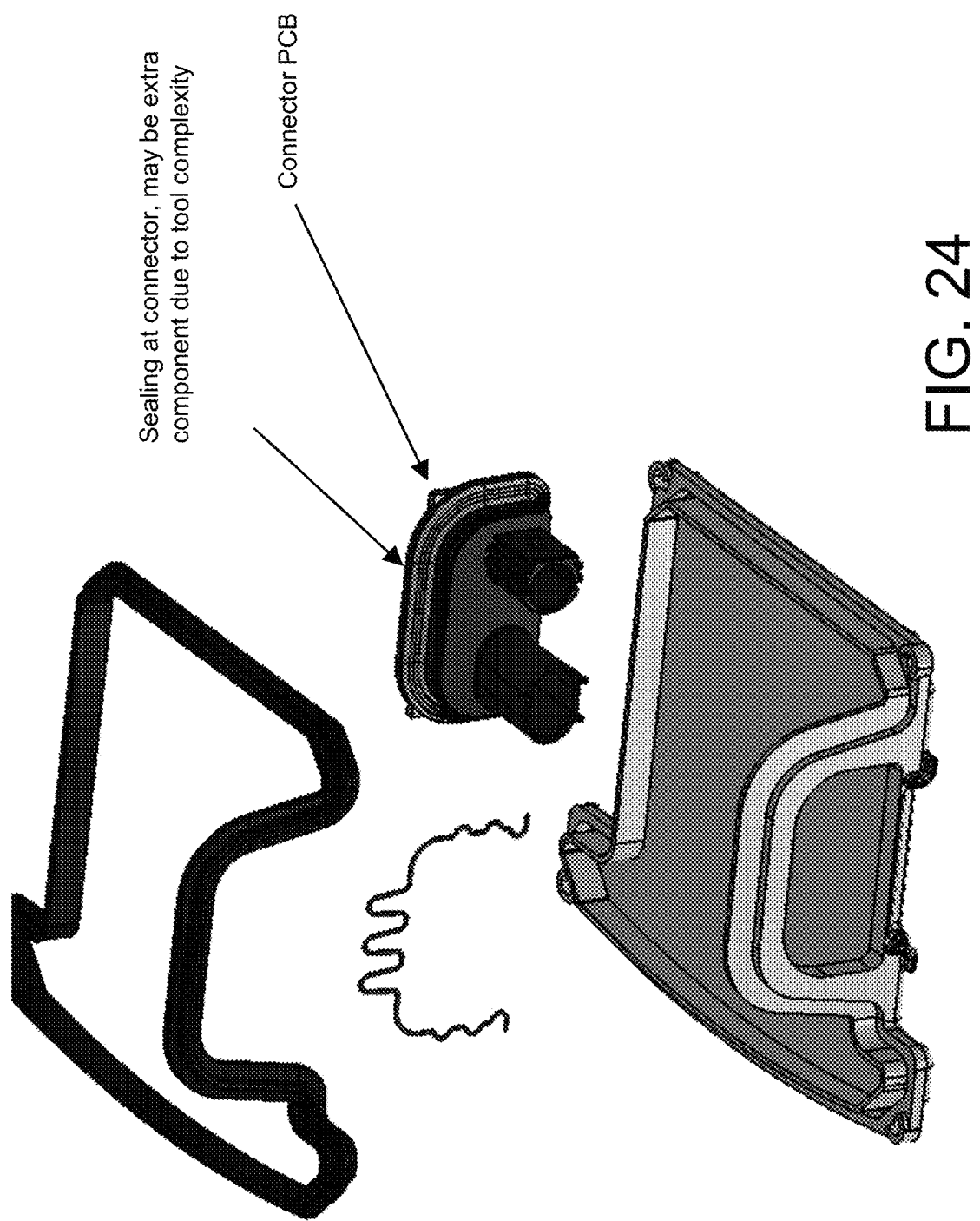
FIGS. 24-27 are perspective views showing the assembly process of the cover of the sensor module.
Figure 25:
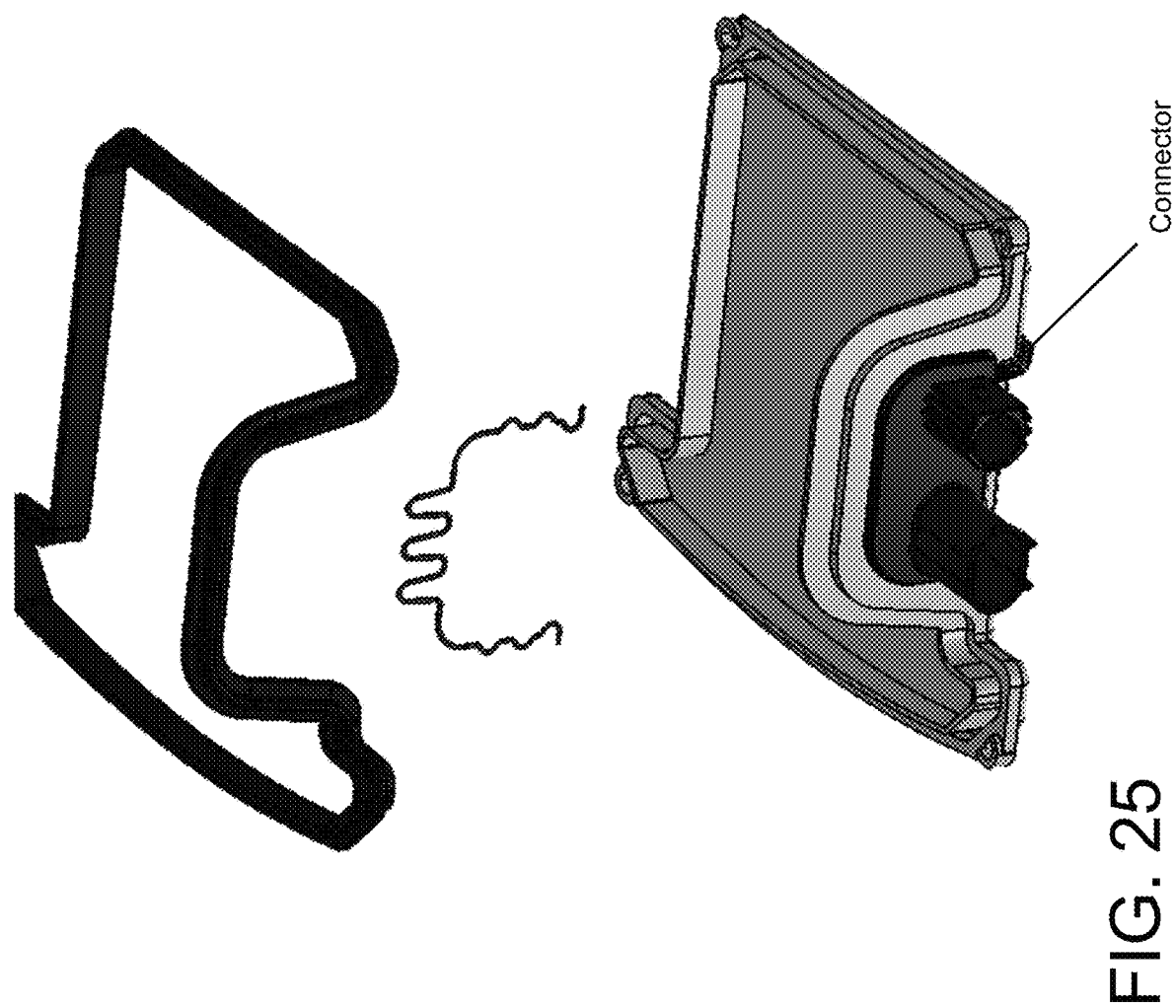

The receiver tubes are placed in the receiving structure of the mirror holder (FIG. 19). No alignment or adhesive is needed. The spring element 36 is disposed over the tubes 30 (FIG. 20) to hold them in place at the holder 28. As shown in FIG. 22A, the spring presses each receiver tube against two surfaces to position the tubes at the mirror holder. The spring may be affixed to the mirror holder using two or more fasteners or screws. The ASIC PCB is attached at the underside of the mirror holder (FIG. 21), such as via fasteners, such as via, for example, four screws. The sensors are then attached at the holder and PCB and aligned with the tubes (FIG. 22). The sensors stick in four cavities inside the mirror holder with gaps to each side. Alignment with 4-fold 3-finger gripper achieves six degrees of freedom adjustability of the sensors (e.g., translational adjustment along x, y and z axes and rotational adjustment about pitch, yaw and roll axes). The sensors are then glued in their aligned position.

Figure 26:
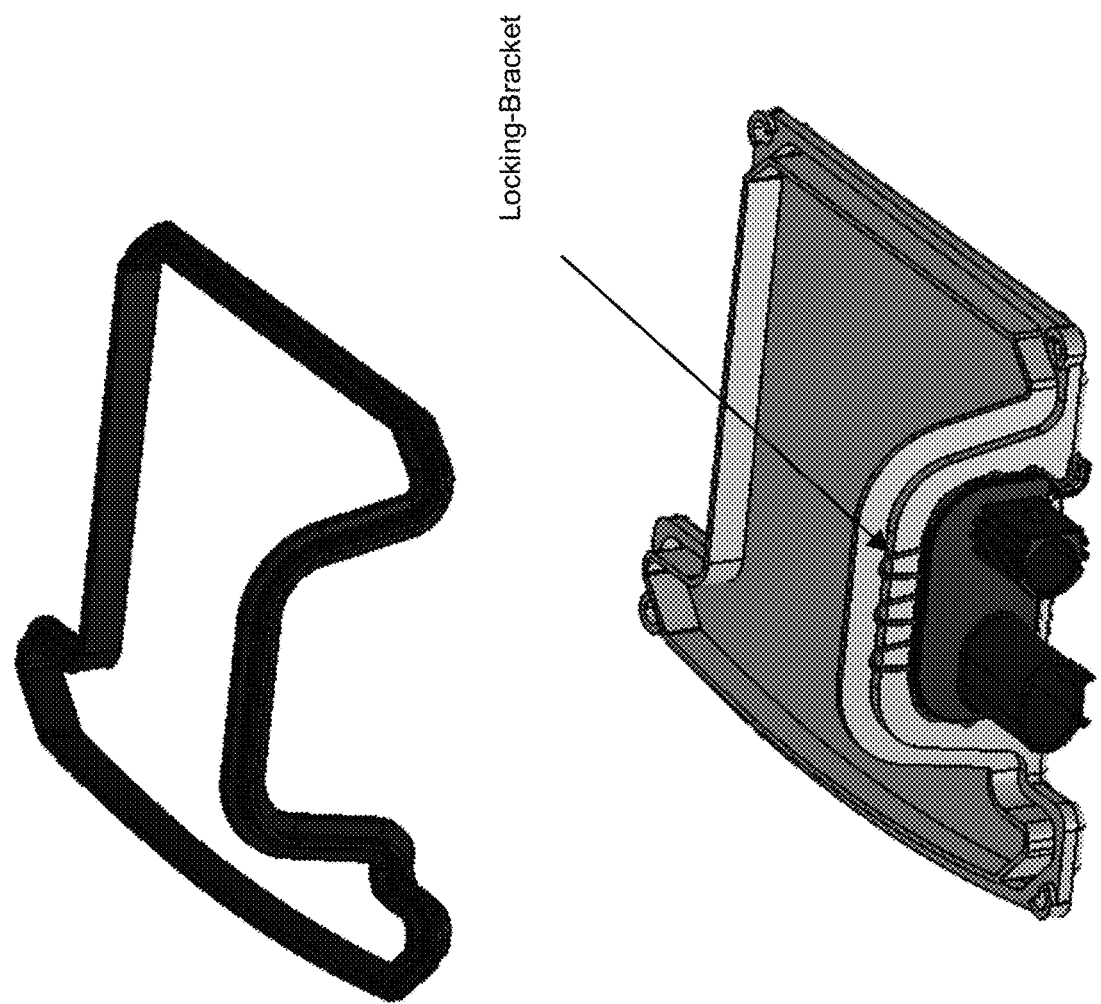
Figure 27:
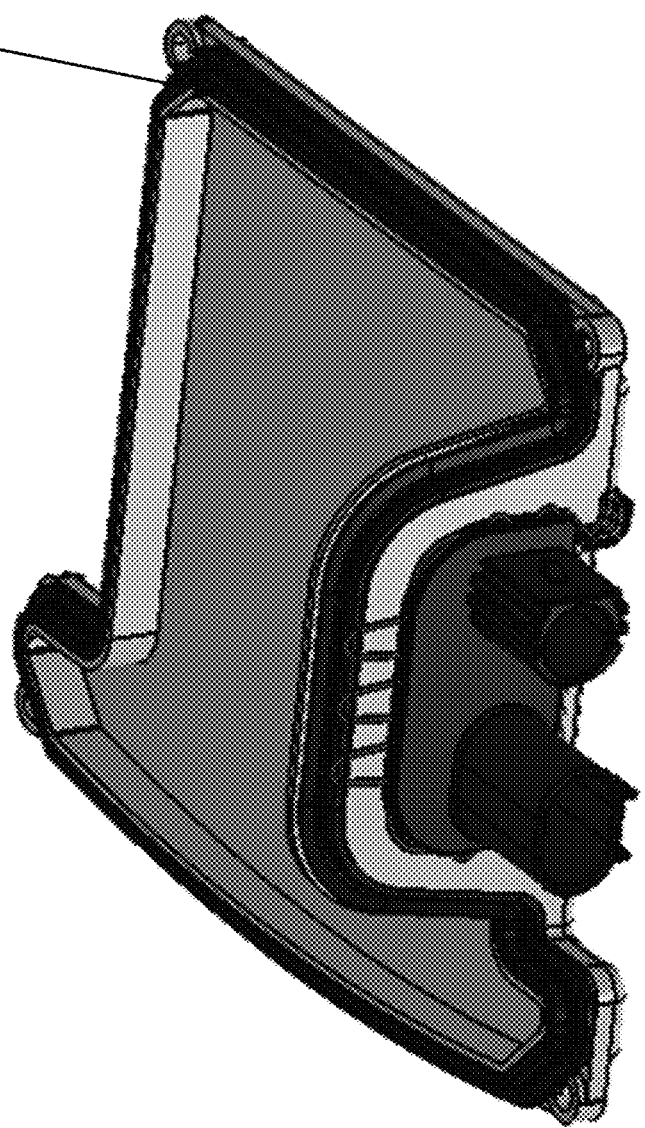

Referring now to FIGS. 23-27, the cover unit or cover assembly 20 includes a diecast metallic cover element 42, a combination connector with a sealing element 44, a connector PCB 46, a locking bracket 48 and a rubber sealing element 50. The sealing at the connector (such as a customized combined connector with sealing) may be an extra component or may be part of the connector. The connector PCB is attached at the connector and soldered thereat. The connector PCB and connector may comprise a pre-assembled subassembly including wiring, depending on the particular application. The connector is pushed through the opening in the diecast cover element with sufficient force to compress the sealing element and seal such that a portion of the connector body protrudes from the cover element for the locking bracket to engage. The connector is pressed into position (FIG. 25) and held in that position, and then the locking bracket is pressed or slid into the gap or groove at the connector until its resting position is reached (FIG. 26). When the cover element is attached at the laser unit and sensor unit assembly (discussed below), a rib on the diecast housing limits disengagement of the locking bracket from the connector (see FIG. 31). The sealing element is then disposed about the periphery of the cover element (FIG. 27). The sealing may comprise rubber or thermoplastic elastomer (TPE)/thermoplastic polyurethane (TPU), and may be pressed into a channel or the like (or an edge of the cover may be pressed into a channel or groove of the sealing element) around the gap at the cover element. Optionally, the cover may use a liquid sealing bead or the like.

Figure 28:
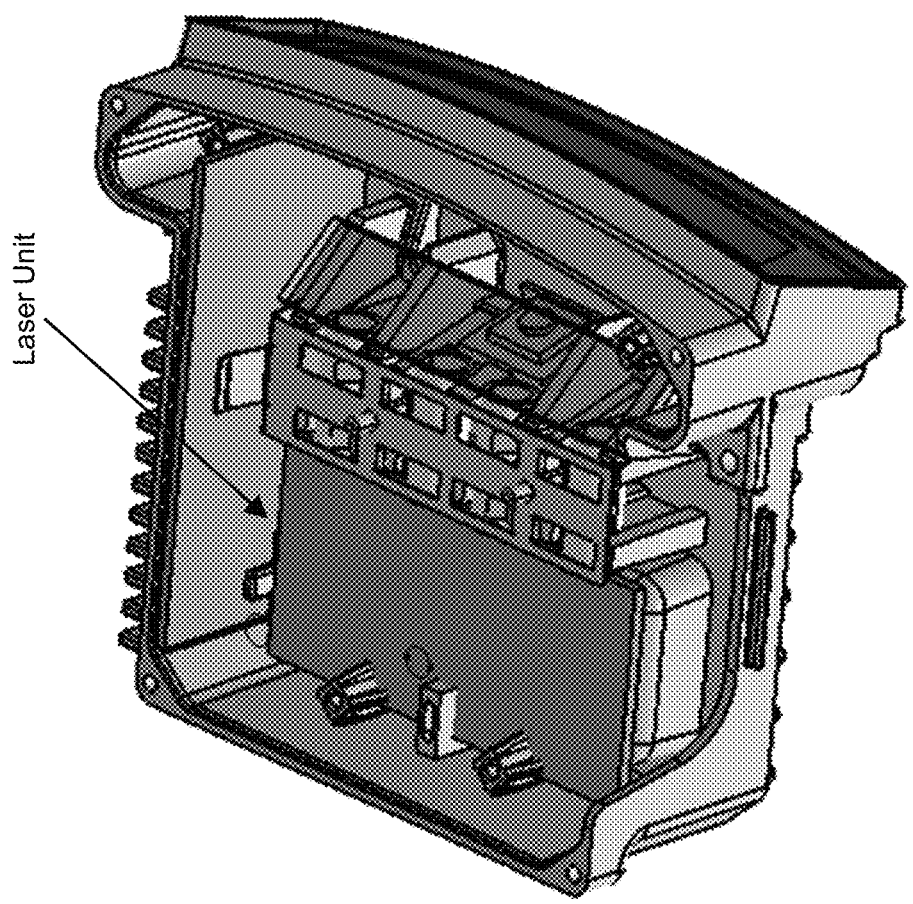
FIG. 28 is an underside perspective view of the laser unit of the sensor module (similar to FIG. 14)
Figure 29:
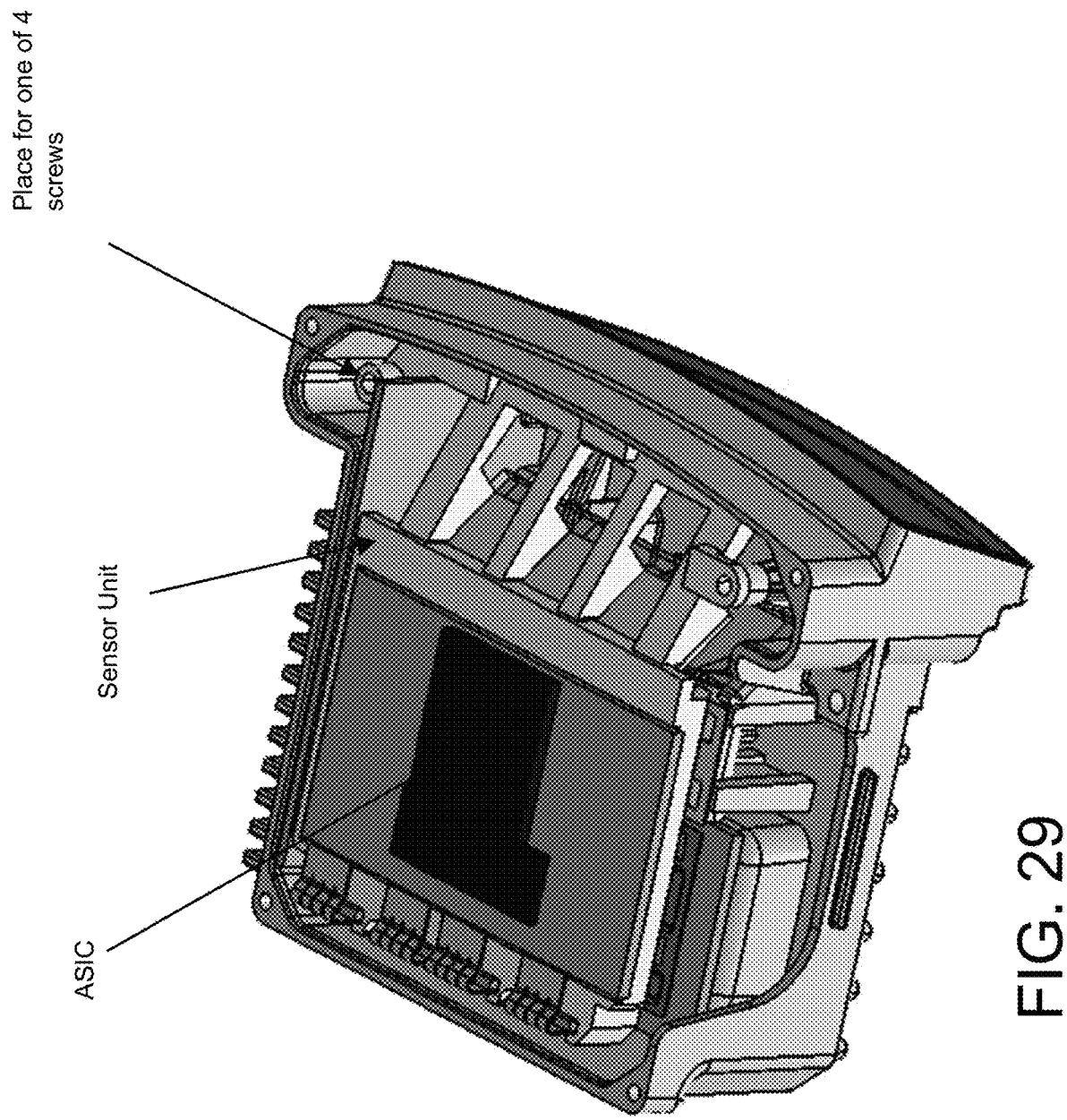
FIG. 29 is a perspective view of the sensor unit combined with and attached at the laser unit of the sensor module.
Figure 31:
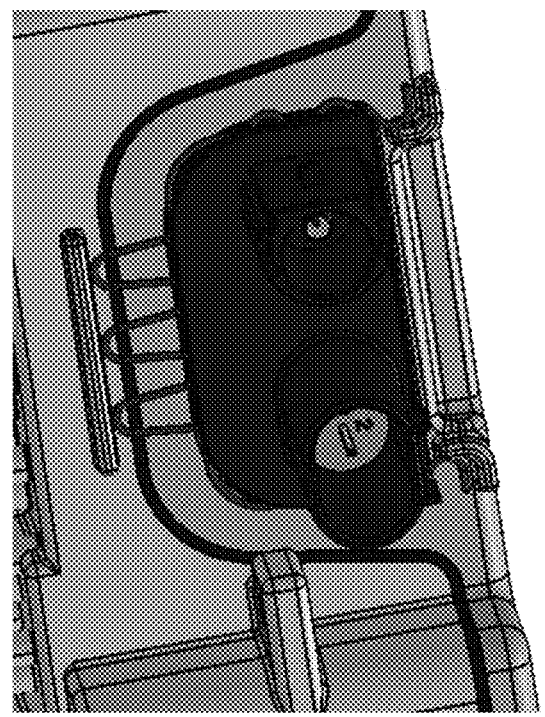
FIG. 31 is a perspective view showing the locking feature of the connector at the cover and sensor module.
Figure 30:
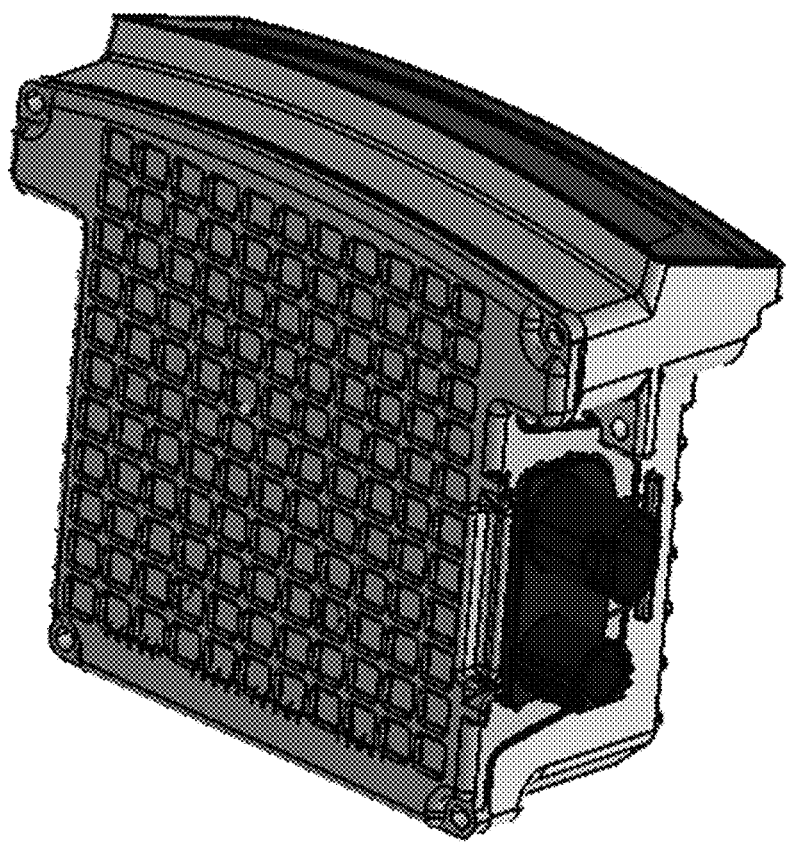
FIG. 30 is an underside perspective view of the sensor module.

The final assembly of the sensor module is made by attaching or combining the sensor unit and the laser unit (FIGS. 28 and 29). The sensor unit may be affixed at the diecast housing via fasteners that attach the mirror holder at the housing, such as at machined reference locations. For example, the sensor unit may be attached via a plurality of fasteners, such as via four screws or the like. A thermal paste may be applied at the ASIC surface. The cover assembly is then attached at the housing (FIG. 30) and attached thereat via one or more fasteners, such as, for example, via four screws or the like. When the cover is attached, the connector protrudes from a side of the housing and the connector PCB is electrically connected to circuitry of the PCBs of the sensor unit and laser unit. As shown in FIG. 31, the connector locking bracket engages a rib or protrusion at the housing to limit retraction of the locking bracket and thus to retain the connector at and relative to the cover element and at and relative to the housing. The connector is configured to electrically connect to a vehicle wire harness when the sensor module is disposed at a vehicle.

Thus, the sensor module provides a two-part design with mutual referencing (for the laser unit/receiver unit). The sensor module also provides an enhanced way of fixing the eight tubes (four laser tubes and four receiver tubes) with tension springs, which push the tubes against their respective reference surfaces. As discussed above, a tension spring urges the laser tubes against reference surfaces of the diecast housing, while another tension spring urges the receiver tubes against reference surfaces of the diecast mirror holder. The sensor module also uses a tension spring (optionally, the same spring that urges the laser tubes toward the reference surfaces of the housing) to additionally press a printed circuit board or PCB (such as a power PCB) against a side wall of the housing for thermocouple coupling (where the side wall of the housing may comprise a plurality of heat sinks or fins or the like to enhance cooling of the power PCB). The sensors are adjusted and held at respective individual nests of the mirror holder via slotted foils, which allows for sensor module adjustment in six degrees of freedom (e.g., translational adjustment along x, y and z axes and rotational adjustment about pitch, yaw and roll axes) while reducing the mechanical stresses in the foil.

The system may utilize sensors, such as radar or lidar sensors or the like. The sensing system may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A lidar sensing system for a vehicle, said lidar sensing system comprising:

a sensor module configured to be disposed at a vehicle equipped with said lidar sensing system;

wherein said sensor module comprises a laser unit, a sensor unit, and a cover unit;

wherein said laser unit comprises a housing with reference surfaces machined thereat for positioning laser collimators, and wherein said laser unit includes a first tension spring that urges said laser collimators against the reference surfaces of said housing;

wherein said sensor unit comprises a holder with reference surfaces machined thereat for positioning receiver tubes, and wherein said sensor unit includes a second tension spring that urges said receiver tubes against the reference surfaces of said holder;

wherein the sensor unit comprises sensors disposed at an end of respective receiver tubes, and wherein the sensors are attached at the holder via respective flexible attaching elements that allow for six-degrees of freedom of adjustment of the sensors relative to the receiver tubes;

wherein, with the flexible attaching elements attached at the holder, (i) the sensors are aligned relative to the laser collimators via the flexible attaching elements, and (ii) the sensors are attached at the holder and glued in their aligned positions;

wherein said holder of said sensor unit is attached at said housing of said laser unit and wherein said cover unit is attached at said housing of said laser unit; and a control, wherein, with said sensor module disposed at the equipped vehicle, an output of said sensor module is communicated to said control, and wherein said control, responsive to the output of said sensor module, determines presence of one or more objects exterior the vehicle and within a field of sensing of said sensor module.

2. The lidar sensing system of claim 1, wherein said laser unit comprises a power printed circuit board, and wherein said first tension spring of said laser unit urges said power printed circuit board against an exterior wall of said housing.

3. The lidar sensing system of claim 1, wherein the sensors are retained at respective nests of said holder.

4. The lidar sensing system of claim 1, wherein said sensor unit comprises a plurality of mirror elements disposed at respective reference surfaces of said holder.

5. The lidar sensing system of claim 1, wherein said cover unit comprises a cover element and an electrical connector configured to electrically connect said sensor module to a vehicle wire harness when said sensor module is disposed at the equipped vehicle.

6. The lidar sensing system of claim 5, wherein said electrical connector is retained at said cover element via a locking bracket.

7. The lidar sensing system of claim 6, wherein, with said cover element attached at said housing, said locking bracket engages a portion of said housing to limit or preclude detachment of said locking bracket.

8. The lidar sensing system of claim 1, wherein the control determines the presence of the one or more objects exterior to the vehicle within the field of sensing via laser light reflected off of the one or more objects and received by the receiver tubes of the sensor unit.

9. The lidar sensing system of claim 1, wherein said holder comprises a diecast holder and wherein said housing comprises a diecast housing.

10. A lidar sensing system for a vehicle, said lidar sensing system comprising:
a sensor module configured to be disposed at a vehicle equipped with said lidar sensing system;
wherein said sensor module comprises a laser unit, a sensor unit, and a cover unit;
wherein said laser unit comprises a housing with reference surfaces machined thereat for positioning laser collimators, and wherein said laser unit includes a first tension spring that urges said laser collimators against the reference surfaces of said housing;
wherein said laser unit comprises a power printed circuit board, and wherein said first tension spring of said laser unit urges said power printed circuit board against an exterior wall of said housing;
wherein said sensor unit comprises a holder with reference surfaces machined thereat for positioning receiver tubes, and wherein said sensor unit includes a second tension spring that urges said receiver tubes against the reference surfaces of said holder;
wherein the sensor unit comprises sensors disposed at an end of respective receiver tubes, and wherein the sensors are attached at the holder via respective flexible attaching elements that allow for six degrees of freedom of adjustment of the sensors relative to the receiver tubes;
wherein, with the flexible attaching elements attached at the holder, (i) the sensors are aligned relative to the laser collimators via the flexible attaching elements, and (ii) the sensors are attached at the holder and glued in their aligned positions;
wherein said holder comprises a diecast holder and wherein said housing comprises a diecast housing;
wherein said holder of said sensor unit is attached at said housing of said laser unit and wherein said cover unit is attached at said housing of said laser unit; and
a control, wherein, with said sensor module disposed at the equipped vehicle, an output of said sensor module is communicated to said control, and wherein said control, responsive to the output of said sensor module, determines presence of one or more objects exterior the vehicle and within a field of sensing of said sensor module.

11. The lidar sensing system of claim 10, wherein the sensors are retained at respective nests of said holder.

12. The lidar sensing system of claim 10, wherein said sensor unit comprises a plurality of mirror elements disposed at respective reference surfaces of said holder.

13. The lidar sensing system of claim 10, wherein said cover unit comprises a cover element and an electrical connector configured to electrically connect said sensor module to a vehicle wire harness when said sensor module is disposed at the equipped vehicle.

14. The lidar sensing system of claim 13, wherein said electrical connector is retained at said cover element via a locking bracket.

15. The lidar sensing system of claim 14, wherein, with said cover element attached at said housing, said locking bracket engages a portion of said housing to limit or preclude detachment of said locking bracket.

16. The lidar sensing system of claim 10, wherein the control determines the presence of the one or more objects exterior to the vehicle within the field of sensing via laser light reflected off of the one or more objects.

17. A lidar sensing system for a vehicle, said lidar sensing system comprising:
a sensor module configured to be disposed at a vehicle equipped with said lidar sensing system;
wherein said sensor module comprises a laser unit, a sensor unit, and a cover unit;
wherein said laser unit comprises a housing with reference surfaces machined thereat for positioning laser collimators, and wherein said laser unit includes a first tension spring that urges said laser collimators against the reference surfaces of said housing;
wherein said laser unit comprises a power printed circuit board, and wherein said first tension spring of said laser unit urges said power printed circuit board against an exterior wall of said housing;
wherein said sensor unit comprises a holder with reference surfaces machined thereat for positioning receiver tubes, and wherein said sensor unit includes a second tension spring that urges said receiver tubes against the reference surfaces of said holder;
wherein the sensor unit comprises sensors disposed at an end of respective receiver tubes, and wherein the sensors are attached at the holder via respective flexible attaching elements that allow for six degrees of freedom of adjustment of the sensors relative to the receiver tubes;
wherein, with the flexible attaching elements attached at the holder, (i) the sensors are aligned relative to the laser collimators via the flexible attaching elements, and (ii) the sensors are adhesively attached at the holder and glued in their aligned positions;
wherein said holder comprises a diecast holder and wherein said housing comprises a diecast housing;
wherein said sensor unit comprises a plurality of mirror elements disposed at respective reference surfaces of said holder;
wherein said holder of said sensor unit is attached at said housing of said laser unit and wherein said cover unit is attached at said housing of said laser unit;
wherein said cover unit comprises a cover element and an electrical connector configured to electrically connect said sensor module to a vehicle wire harness when said sensor module is disposed at the equipped vehicle;

wherein said electrical connector is retained at said cover element via a locking bracket, and wherein, with said cover element attached at said housing, said locking bracket engages a portion of said housing to limit or preclude detachment of said locking bracket; and a control, wherein, with said sensor module disposed at the equipped vehicle, an output of said sensor module is communicated to said control, and wherein said control, responsive to the output of said sensor module, determines presence of one or more objects exterior the vehicle and within a field of sensing of said sensor module.

18. The lidar sensing system of claim 17, wherein the control determines the presence of the one or more objects exterior to the vehicle within the field of sensing via laser light reflected off of the one or more objects and received by the receiver tubes of the sensor unit.

\* \* \* \* \*